United States Patent
Kobayashi

(10) Patent No.: US 10,778,130 B2
(45) Date of Patent: Sep. 15, 2020

(54) CONTROL APPARATUS FOR ALTERNATING-CURRENT ROTARY ELECTRIC MACHINE

(71) Applicant: DENSO CORPORATION, Kariya, Aichi-pref. (JP)

(72) Inventor: Naoto Kobayashi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/254,346

(22) Filed: Jan. 22, 2019

(65) Prior Publication Data

US 2019/0229665 A1   Jul. 25, 2019

(30) Foreign Application Priority Data

Jan. 23, 2018 (JP) ................. 2018-008952

(51) Int. Cl.
| | |
|---|---|
| *H02P 21/00* | (2016.01) |
| *H02P 21/14* | (2016.01) |
| *H02P 27/08* | (2006.01) |
| *H02P 21/22* | (2016.01) |
| *H02P 29/60* | (2016.01) |
| H02M 7/5387 | (2007.01) |

(52) U.S. Cl.
CPC ............ *H02P 21/141* (2013.01); *H02P 21/22* (2016.02); *H02P 27/08* (2013.01); *H02P 29/60* (2016.02); *H02M 7/53871* (2013.01)

(58) Field of Classification Search
CPC .. H02M 7/53871; H02P 21/141; H02P 21/22; H02P 27/08

USPC .................................................... 318/400.02
See application file for complete search history.

(56) References Cited

U.S. PATENT DOCUMENTS

| | | | |
|---|---|---|---|
| 5,650,706 A | 7/1997 | Yamada et al. | |
| 9,059,653 B2* | 6/2015 | Shimada | H02P 6/183 |
| 2006/0119312 A1 | 6/2006 | Okamura et al. | |
| 2008/0007198 A1* | 1/2008 | Kinpara | H02P 21/14 318/807 |
| 2008/0186000 A1* | 8/2008 | Kimura | B60L 15/025 322/23 |
| 2013/0278200 A1* | 10/2013 | Fujii | H02P 21/06 318/722 |
| 2015/0137720 A1* | 5/2015 | Kobayashi | H02P 21/141 318/400.15 |
| 2015/0333681 A1* | 11/2015 | Matsuki | H02P 21/06 318/400.02 |

(Continued)

*Primary Examiner* — Eduardo Colon Santana
*Assistant Examiner* — Gabriel Agared
(74) *Attorney, Agent, or Firm* — Oliff PLC

(57) ABSTRACT

In a control apparatus, an error correction outputting unit has correction information indicative of a relationship between values of an estimation error correction and corresponding values of at least one parameter correlating with an operating condition of a rotary electric machine. The error correction outputting unit outputs, in response to an input of a value of the at least one parameter, a value of the estimation error correction from the correction information. The value of the estimation error correction corresponds to the input value of the at least one parameter. A magnetic flux estimation corrector corrects, based on the value of the estimation error correction, an estimate of magnetic flux calculated by a magnetic flux estimator to thereby output a corrected magnetic flux estimate.

5 Claims, 16 Drawing Sheets

(56) References Cited

U.S. PATENT DOCUMENTS

| | | | |
|---|---|---|---|
| 2015/0372627 A1* | 12/2015 | Kim | H02P 21/141 |
| | | | 318/801 |
| 2017/0155349 A1* | 6/2017 | Kim | H02P 6/28 |
| 2018/0019700 A1* | 1/2018 | Suzuki | H02P 29/64 |
| 2019/0229664 A1 | 7/2019 | Kobayashi | |

* cited by examiner

FIG.5
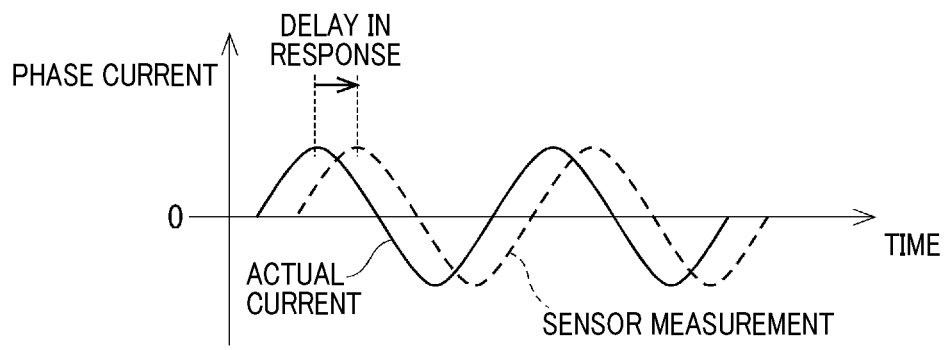
⬇ dq CONVERSION
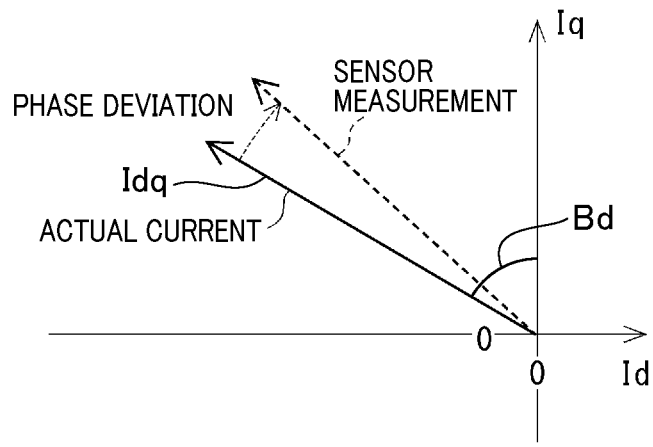
⬇ ASSOCIATE PHASE DEVIATION WITH ANGULAR VELOCITY ω
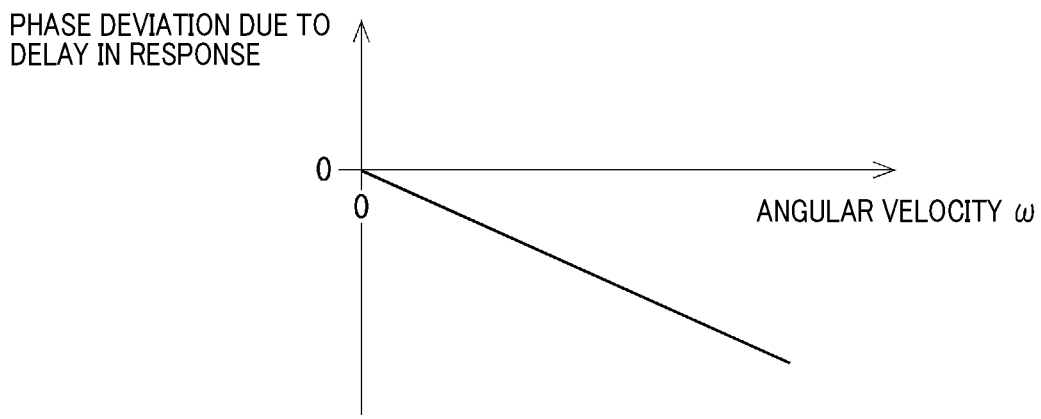

VOLTAGE DROP Vf ACROSS FLYBACK DIODE

VOLTAGE DROP Vce ACROSS SWITCHING ELEMENT

FIRST EMBODIMENT

FIG.10

FIRST EMBODIMENT

| | ANGULAR-VELOCITY PARAMETER | CURRENT/TORQUE PARAMETERS | TEMPERATURE PARAMETER | DC VOLTAGE PARAMETER |
|---|---|---|---|---|
| MAGNETIC FLUX ESTIMATION EQUATION | ANGULAR-VELOCITY PARAMETER AND CURRENT/TORQUE PARAMETERS | | | |
| CURRENT SENSOR VARIATION | DELAY IN RESPONSE | | TEMPERATURE CHARACTERISTIC | |
| ANGLE SENSOR VARIATION | DELAY IN RESPONSE | | TEMPERATURE CHARACTERISTIC | |
| INDUCTANCE VARIATION | | CURRENT DEPENDENCY | TEMPERATURE CHARACTERISTIC | |
| WINDING RESISTANCE VARIATION | | | TEMPERATURE CHARACTERISTIC | |
| VOLTAGE VARIATION DUE TO DEADTIME | | AMPLITUDE AND PHASE OF VOLTAGE DEVIATION | TEMPERATURE CHARACTERISTIC | AMPLITUDE IS PROPORTIONAL TO DC VOLTAGE PARAMETER |
| VOLTAGE VARIATION DUE TO VOLTAGE DROP ACROSS SWITCHING ELEMENT | | AMPLITUDE AND PHASE OF VOLTAGE DEVIATION | TEMPERATURE CHARACTERISTIC | |

SECOND EMBODIMENT

FIG.14

SECOND EMBODIMENT

| | ANGULAR-VELOCITY PARAMETER | CURRENT/TORQUE PARAMETERS | TEMPERATURE PARAMETER | DC VOLTAGE PARAMETER |
|---|---|---|---|---|
| MAGNETIC FLUX ESTIMATION EQUATION | ANGULAR-VELOCITY PARAMETER AND INPUT POWER PARAMETER {Id, Iq AND Vd, Vq} {TORQUE AND ANGULAR VELOCITY} | | | |
| CURRENT SENSOR VARIATION | DELAY IN RESPONSE | | TEMPERATURE CHARACTERISTIC | |
| ANGLE SENSOR VARIATION | DELAY IN RESPONSE | | TEMPERATURE CHARACTERISTIC | |
| WINDING RESISTANCE VARIATION | | | TEMPERATURE CHARACTERISTIC | |
| VOLTAGE VARIATION DUE TO DEADTIME | | | TEMPERATURE CHARACTERISTIC | AMPLITUDE IS PROPORTIONAL TO DC VOLTAGE PARAMETER |
| VOLTAGE VARIATION DUE TO VOLTAGE DROP ACROSS SWITCHING ELEMENT | | AMPLITUDE VARIATION | TEMPERATURE CHARACTERISTIC | |
| INDUCTANCE VARIATION | | CURRENT DEPENDENCY | TEMPERATURE CHARACTERISTIC | |

THIRD EMBODIMENT

FIG.18

THIRD EMBODIMENT

|  | ANGULAR-VELOCITY PARAMETER | CURRENT/TORQUE PARAMETERS | TEMPERATURE PARAMETER | DC VOLTAGE PARAMETER |
|---|---|---|---|---|
| MAGNETIC FLUX ESTIMATION EQUATION |  | Id AND MAGNETIC-SENSOR MEASUREMENT (Id CORRESPONDING TO TORQUE) |  |  |
| CURRENT SENSOR VARIATION | DELAY IN RESPONSE |  | TEMPERATURE CHARACTERISTIC |  |
| ANGLE SENSOR VARIATION | DELAY IN RESPONSE |  | TEMPERATURE CHARACTERISTIC |  |
| MAGNETIC SENSOR VARIATION |  |  | TEMPERATURE CHARACTERISTIC |  |
| INDUCTANCE VARIATION |  | CURRENT DEPENDENCY | TEMPERATURE CHARACTERISTIC |  |

FIG.19

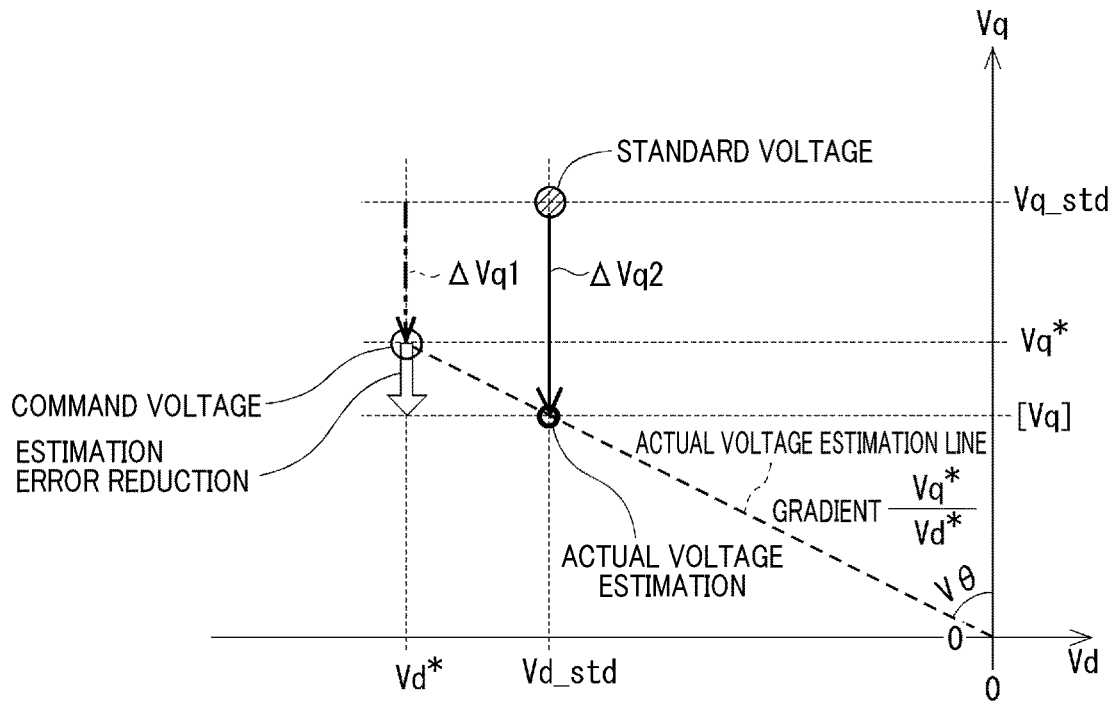

CONTROL APPARATUS FOR ALTERNATING-CURRENT ROTARY ELECTRIC MACHINE

CROSS REFERENCE TO RELATED APPLICATIONS

This application is based on and claims the benefit of priority from Japanese Patent Application 2018-008952 filed on Jan. 23, 2018, the disclosure of which is incorporated in its entirety herein by reference.

TECHNICAL FIELD

The present disclosure relates to control apparatuses for controlling a permanent-magnet alternating-current (AC) rotary electric machine.

BACKGROUND

There are known technologies for estimating magnetic flux of a permanent magnet unit mounted to a permanent-magnet AC rotary electric machine.

SUMMARY

According to an exemplary aspect of the present disclosure, there is provided a control apparatus including an error correction outputting unit. The error correction outputting unit has correction information indicative of a relationship between values of an estimation error correction and corresponding values of at least one parameter correlating with an operating condition of a rotary electric machine. The error correction outputting unit outputs, in response to an input of a value of the at least one parameter, a value of the estimation error correction from the correction information. The value of the estimation correction information corresponding to the input value of the at least one parameter. A magnetic flux estimation corrector corrects, based on the value of the estimation error correction, an estimate of magnetic flux calculated by a magnetic flux estimator to thereby output a corrected magnetic flux estimate.

BRIEF DESCRIPTION OF THE DRAWINGS

Other aspects of the present disclosure will become apparent from the following description of embodiments with reference to the accompanying drawings in which:

FIG. 5 is a joint graph schematically illustrating delay of a current measurement from actual phase current, phase deviation of a current measurement from an actual current, and a relationship between phase deviation based on delay in response and angular velocity according to the first embodiment;

FIG. 10 is a table schematically illustrating the relationships between factors of the magnetic-flux estimation errors and operating condition parameters according to the first embodiment;

FIG. 14 is a table schematically illustrating the relationships between factors of the magnetic-flux estimation errors and operating condition parameters according to the second embodiment;

FIG. 18 is a table schematically illustrating the relationships between factors of the magnetic-flux estimation errors and operating condition parameters according to the third embodiment; and FIG. 19 is a graph schematically illustrating how to estimate a magnetic flux variation based on d- and q-axis command voltages.

DETAILED DESCRIPTION OF EMBODIMENT

Inventor's Viewpoint

Figure 1:
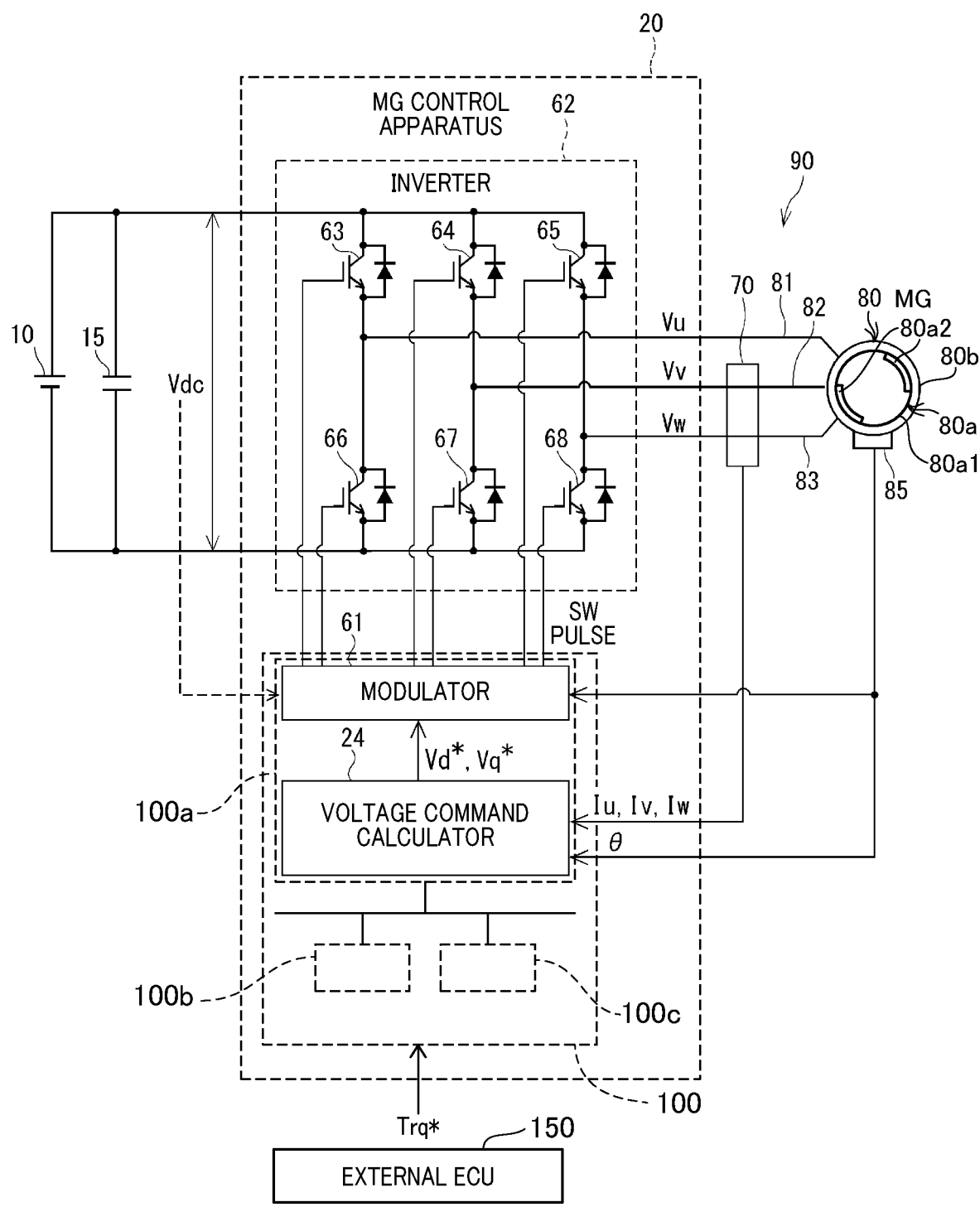
FIG. 1 is an overall structural diagram schematically illustrating a motor-generator drive system installed in a vehicle according to a present embodiment of the present disclosure.

One type of control apparatuses for a salient-pole permanent-magnet motor, which is an example of a permanent-magnet AC rotary electric machine is configured to control on-off switching operations of each pair of upper- and lower-arm switching elements of a power converter for the corresponding phase of the permanent-magnet motor. The control apparatus is also configured to adjust d- and q-axis voltages actually applied to the salient-pole permanent-magnet motor in accordance with predetermined d- and q-axis command voltages.

The control apparatus configured set forth above specially performs a method of estimating magnetic flux of a permanent magnet unit of the motor in accordance with plural inputs including the measurement values of the q-axis voltage, a q-axis current, and a d-axis current measured by sensors, and machine constant parameters of the motor. Then, the method detects demagnetization of the permanent magnet unit and/or corrects error included in output torque of the motor in accordance with the estimated magnetic flux of the permanent magnet.

There is a possibility of an estimation error between the magnetic flux estimated based on the plural inputs and actual magnetic flux. For example, if current sensors are used to measure information correlating with the d- and q-axis currents, the delay in response of each current sensor may cause an estimation error between the estimated magnetic flux and the actual magnetic flux.

Embodiment

From the above viewpoint, the following describes the first to third embodiments of the present disclosure with reference to the accompanying drawings. In the embodiments, like parts between the embodiments, to which like reference characters are assigned, are omitted or simplified to avoid redundant description. The first to third embodiments can be collectively referred to as a present embodiment.

The present disclosure embodies a motor-generator (MG) control apparatus 20 according to the present embodiment, which is an example of a control apparatus for a permanent-magnet AC rotary electric machine. That is, the MG control apparatus is configured to control energization of a motor-generator (MG) 80 that serves as a power engine of a hybrid vehicle or an electric vehicle.

The following describes an example of the overall structure of an MG driving system 90 with reference to FIG. 1. The MG driving system 90 is installed in a vehicle, typically a hybrid vehicle equipped with an engine (not shown).

Referring to FIG. 1, the MG driving system 90 includes the MG control apparatus 20. Note that FIG. 1 schematically illustrates a common structure of the MG control apparatus 20 while a specific structure of the MG control apparatus 20, which will be described later, according to the present embodiment is omitted in illustration in FIG. 1.

The MG driving system 90 also includes the MG 80, a battery 10 as an example of direct-current (DC) power sources, and the MG control apparatus 20 includes an inverter 62.

The MG 80 is for example designed as a permanent magnet synchronous three-phase AC motor-generator. The MG 80 installed in the hybrid vehicle is coupled to a driving axle having at both ends driving wheels via a gear mechanism, such as a transmission. That is, the MG 80 serves as a motor in a power running mode to generate torque that rotatably drives the driving axle to thereby rotatably drive the driving wheels via the gear mechanism. The MG 80 also serves as a generator in a regenerative mode to generate electrical power based on torque transferred from the engine and/or the driving wheels, and charge the generated electrical power to the battery 10.

The MG 80 is provided with a rotor 80a and a stator 80b. Note that FIG. 1 schematically illustrates the structure of the MG 80.

The rotor 80a includes a rotor core 80a1, and a permanent magnet unit 80a2 that is comprised of at least one pair of permanent magnets embedded in the rotor core 80a1. That is, the MG 80 is designed as an interior permanent magnet synchronous motor (IPMSM). Note that the MG 80 can be designed as a surface permanent magnet synchronous motor (SPMSM).

The rotor 80a has a direct axis (d-axis) in line with a direction of magnetic flux created by an N pole of the permanent magnet unit 80a2. The rotor 80a also has a quadrature axis (q-axis) with a phase being $\pi/2$-radian electrical angle leading with respect to a corresponding d-axis during rotation of the rotor 80a. In other words, the q-axis is electromagnetically perpendicular to the d-axis. The d and q axes constitute a d-q coordinate system, i.e. a two-phase rotating coordinate system, defined to the rotor 80a.

The stator 80b includes a stator core such that the rotor 80a is rotatably arranged with respect to the stator core. The stator 80b also includes a set of three-phase windings, i.e. armature windings, 81, 82, and 83 wound in the stator core.

The three-phase, i.e. U-, V-, and W-phase, windings 81, 82, and 83 are wound in the stator core such that the U-, V-, and W-phase windings 81, 82, and 83 are shifted by an electrical angle of, for example, $2\pi/3$ radian in phase from each other.

For example, the three-phase windings 81, 82, and 83 each have a first end connected to a common junction, i.e. a neutral point, and a second end, which is opposite to the first end, to a separate terminal in, for example, a star-configuration.

The MG control apparatus 20 includes an inverter 62, and is configured such that the inverter 62 converts DC power output from the battery 10 into three-phase alternating-current (AC) voltages, and supplies the three-phase AC voltages to the respective three-phase windings 81, 82, and 83. This creates a rotating magnetic field. This enables the rotor 80a to turn based on magnetic attractive force between the rotating magnetic field and the magnetic flux of the rotor 10a.

A chargeable DC battery, such as a nickel-hydrogen battery or a lithium-ion battery, can be used as the battery 10. An electrical double layer capacitor can also be used as the DC power source in place of the battery 10.

The MG drive system 90 includes a current sensor 70 arranged to measure at least two of three-phase currents Iu, Iv, and Iw respectively flowing through the U-, V-, and W-phase windings 81, 82, and 83. If the current sensor 70 is configured to measure two phase currents, such s V- and W-phase currents Iv and Iw flowing through the respective V- and W-phase windings 82 and 83, the current sensor 70 can be configured to calculate the remaining U-phase current Iu using Kirchhoffs law.

The MG drive system 90 also includes a rotational angle sensor 85. The rotational angle sensor 85, which is comprised of, for example, a resolver, is disposed to be adjacent to, for example, the rotor 80a of the MG 80. The rotational angle sensor 85 is configured to measure, i.e. monitor, a rotational electrical angle θ of the rotor 80a of the MG 80, and output the rotational electrical angle θ to the MG control apparatus 20. The following may describe the rotational angle sensor 85 simply as an angle sensor 85.

The inverter 62 includes six switching elements 63 to 68 connected in bridge configuration, and each switching element 63-68 includes a flyback or free-wheel diode D.

Specifically, the switching elements 63 and 66 are a pair of U-phase upper- and lower-arm switching elements connected in series to each other, and the switching elements 64 and 67 are a pair of V-phase upper- and lower-arm switching elements connected in series to each other. Additionally, the switching elements 65 and 68 are a pair of W-phase upper- and lower-arm switching elements connected in series to each other.

Each switching element 63 to 68 includes for example a main semiconductor switching element, such as an IGBT. That is, the emitter of each of the upper-arm switching elements 63 to 65 is connected to the collector of the corresponding one of the lower-arm switching elements 66 to 68.

The collectors of the switching elements 63 to 65 are commonly connected to the positive terminal of the battery 10, and the emitters of the switching elements 66 to 68 are connected to the negative terminal of the battery 10. This results in the first pair of switching elements 63 and 66, the second pair of switching elements 64 and 67, and the third pair of switching elements 65 and 68 being connected in parallel to the battery 10.

The connection point between the U-phase upper- and lower-arm switching elements 63 and 66 is connected to the separate terminal of the U-phase winding 81, and the connection point between the V-phase upper- and lower-arm switching elements 64 and 67 is connected to the separate terminal of the V-phase winding 82. Additionally, the connection point between the W-phase upper- and lower-arm switching elements 65 and 68 is connected to the separate terminal of the W-phase winding 83.

Each of the flyback diodes D is connected in antiparallel to a corresponding one of the IGBTs of the switching elements 63 to 68. Each of the flyback diodes D allows a current to flow from the low-potential side, i.e. emitter side, to the high-potential side, i.e. the collector side. For example, the pair of IGBTs and corresponding flyback diodes D for each phase can be modularized as a power module The MG drive system 90 includes a smoothing capacitor 15 connected in parallel to the battery 10 at the input side of the smoothing capacitor 15. The smoothing capacitor 15 is operative to smooth a DC voltage, output from the battery 10, thus outputting a smoothed DC voltage Vdc as an inverter input voltage. Note that the smoothed DC voltage Vdc will be simply referred to as a DC voltage Vdc hereinafter.

The DC voltage Vdc is directly input to the inverter 60. That is, the MG drive system 90 includes no boosting converters between the battery 10 and the inverter 62, but can include a boosting converter between the battery 10 and the inverter 62. The boosting converter can be configured to boost the DC voltage, and output a boosted DC voltage as the inverter input voltage to be input to the inverter 62.

The MG drive system 90 is also operative to obtain the DC voltage Vdc input to the inverter 62.

The MG control apparatus 20 includes a controller 100 designed as, for example, a microcomputer circuit. Specifically, the controller 100 essentially includes, for example, a CPU, i.e. a processor, 100a, a memory 100b comprised of, for example, a RAM and a ROM, and a peripheral circuit 100c; the ROM is an example of a non-transitory storage medium. At least part of all functions provided by the controller 100 can be implemented by at least one processor; the at least one processor can be comprised of (1) The combination of at least one programmable processing unit, i.e. at least one programmable logic circuit, and at least one memory (2) At least one hardwired logic circuit (3) At least one hardwired-logic and programmable-logic hybrid circuit Specifically, the controller 100 is configured such that the CPU 100a performs instructions of programs stored in the memory 100b, thus performing predetermined software tasks associated with the hybrid vehicle. The controller 100 can also be configured such that the at least one special-purpose electronic circuit performs predetermined hardware tasks associated with the MG 80. The controller 100 can be configured to perform both the software tasks and the hardware tasks.

The gates, i.e. control terminals, of the switching elements 63 to 68 are connected to the controller 100. The upper- and lower-arm switching elements of each pair are complementarily turned on under control of the controller 100.

Next, the following describes an example of the configuration of the MG control apparatus 20 for each of the first to third embodiments. Reference numerals 201 to 203 are respectively assigned to the MG control apparatuses 20 according to the first to third embodiments.

Specifically, a magnetic flux estimator 41 of the MG control apparatus 201 according to the first embodiment is configured to estimate magnetic flux in accordance with a q-axis command voltage Vq*, and, a magnetic flux estimator 42 of the MG control apparatus 202 according to the second embodiment is configured to estimate magnetic flux in accordance with input power to the inverter 61. In addition, a magnetic flux estimator 43 of the MG control apparatus 203 according to the third embodiment is configured to estimate magnetic flux in accordance with measurements measured by a magnetic sensor.

First Embodiment

The following describes the first embodiment with reference to FIGS. 2 to 10.

The controller 100 of the MG control apparatus 201 functionally includes a voltage command calculator 24, a dq converter 29, a modulator 61, an angular velocity calculator 86, a magnetic flux estimator 41, an error correction outputting unit 50, and a corrector 55.

That is, the MG control apparatus 201 includes the command voltage calculator 24, the dq converter 29, the modulator 61, the angular velocity calculator 86, the magnetic flux estimator 41, the error correction outputting unit 50, the corrector 55, and the inverter 62.

Figure 2:
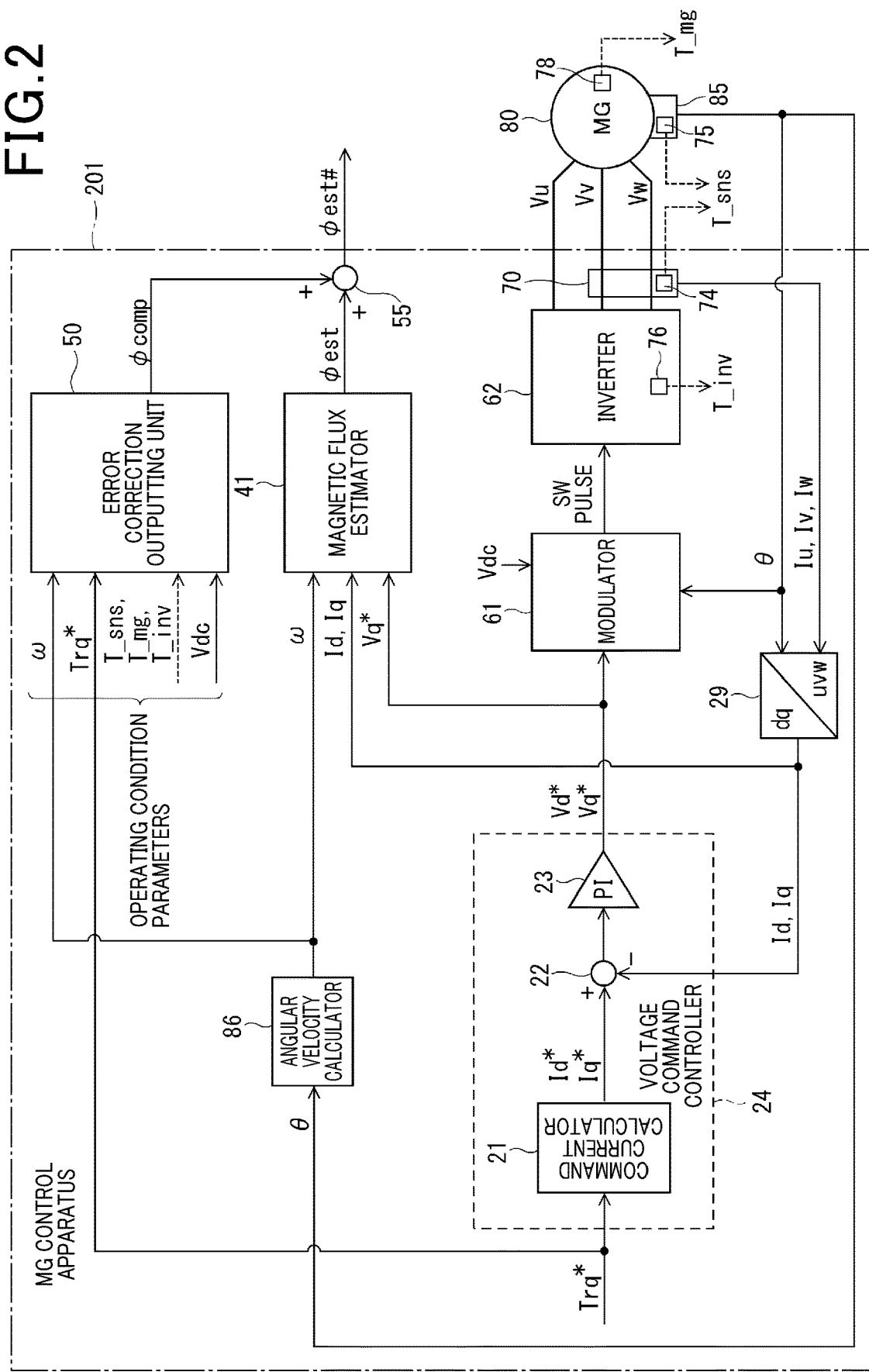
FIG. 2 is a block diagram schematically illustrating the structure of an MG control apparatus according to the first embodiment.

As illustrated in FIG. 2, the MG control apparatus 201 according to the first embodiment is configured to perform, for example, a current feedback control task to thereby calculate d- and q-axis command voltages Vd* and Vq* to be applied to the MG 80 in accordance with (1) Request torque Trq* input to the MG control apparatus 201 from an external electronic control unit (ECU) 150

(2) The three-phase currents Iu, Iv, and Iw fed back to the MG control apparatus 201 from the current sensor 70

(3) The rotational electric angle θ fed back to the MG control apparatus 201 from the angle sensor 85

The MG control apparatus 201 can be configured to perform a torque feedback control task to thereby compare an estimated value of the output torque of the MG 80 with the request torque Trq*, and adjust, based on the comparison results, the pattern of a pulse output voltage to be output to the MG 80, thus causing the output torque of the MG 80 to follow the request torque Trq*.

Each of the current feedback control task and the torque feedback control task uses known vector control based on the d-q coordinate system, i.e. the two-phase rotating coordinate system, defined relative to the rotor 80*a*.

Referring to FIG. 2, the dq converter 29 converts the three-phase currents Iu, Iv and Iw into d- and q-axis currents Id and Iq using the rotational electrical angle θ and, for example, a known conversion equation or map information. Thereafter, the dq converter 29 feeds the d- and q-axis currents Id and Iq back to the voltage command calculator 24.

In addition, the voltage command calculator 24 includes a command current calculator 21, a current deviation calculator 22, and a control unit 23.

The command current calculator 21 calculates a command d-axis current Id* and a command q-axis current Iq* in the d-q coordinate system of the rotor 80*a* of the MG 80 in accordance with the request torque Trq*. The command d-axis current Id* and command q-axis current Iq* are required to obtain torque of the MG 80 matching with the request torque Trq*.

For example, the command current calculator 21 has a map in data-table format, in mathematical expression format, and/or program format in, for example, the memory 100*b*. The map includes information indicative of a relationship between values of each of the d-axis current command Id* and the q-axis current command Iq*, and values of the request torque Trq*. Specifically, the command current calculator 21 refers to the map, and extracts a value of each of the d-axis current command Id* and the q-axis current command Iq* corresponding to the input value of the request torque Trq*. Note that a d-axis current and a q-axis current will be simply described as d-q axis currents hereinafter.

The current deviation calculator 22 subtracts the d-axis current Id fed back from the dq converter 29 from the d-axis current command Id* to thereby calculate a d-axis current deviation ΔId. The current deviation calculator 22 also subtracts the q-axis current value Iq fed back from the dq converter 29 from the q-axis current command Iq* to thereby calculate a q-axis current deviation ΔIq.

The control unit 23 performs a proportional-integral (PI) feedback operation using the d-axis current deviation ΔId as input data, and a proportional gain term and an integral gain term of a PI feedback control algorithm (PI algorithm). The PI feedback operation calculates a sinusoidal d-axis command voltage Vd* such that the d-axis current deviation ΔId converges to zero, thus causing the d-axis current Id to follow the d-axis command current Id*.

The control unit 23 performs a PI feedback operation using the q-axis current deviation ΔIq as input data, and a proportional gain term and an integral gain term of a PI feedback control algorithm (PI algorithm). The PI feedback operation calculates a sinusoidal q-axis command voltage Vq* such that the q-axis current deviation ΔIq converges to zero, thus causing the q-axis current Iq to follow the q-axis command current Iq*.

To the modulator 61, the DC voltage Vdc, the d-axis command voltage Vd* and q-axis command voltage Vq*, and the rotational electrical angle θ of the MG 80 are input.

Then, the modulator 61 generates switching pulse signals in accordance with the smoothed DC voltage Vdc, the d-axis command voltage Vd*, the q-axis command voltage Vq*, and the rotational electrical angle θ of the MG 80, and outputs the generated switching pulse signals to the inverter 62.

For example, the modulator 61 selectively performs, based on, for example, a predetermined modulation factor of the inverter 62 and RPM-torque characteristics of the MG 80, one of the following modulation modes including (1) A known three-phase modulation mode in pulse-width modulation (PWM) control (2) A known two-phase modulation mode in the PWM control (3) A known pulse pattern modulation mode (4) A known rectangular modulation mode Note that the two-phase modulation mode is configured to, for example, determine the switching pulse signals such that (1) The upper-arm switch of a successively selected one of the three phases is fixed to off for every 120 electrical degrees of the MG 80

(2) The lower-arm switch of the successively selected one of the three-phases is fixed to on for every 120 electrical degrees of the MG 80

That is, the three-phase modulation mode is configured to perform pulse width modulation based on comparison in magnitude between each of three-phase sinusoidal duty signals, which have a phase difference of 120 electrical degrees from each other, and are normalized by half of the DC voltage Vdc, and a carrier signal, such as a triangular carrier signal. This generates each of the switching pulse signals for the respective switching elements 63 to 68.

The two-phase modulation mode is configured to perform, for example, a two-phase modulation task that calculates command duties such that (1) The upper-arm switch of a successively selected one of the three phases is fixed to off for every 120 electrical degrees of the MG 80

(2) The lower-arm switch of the successively selected one of the three-phases is fixed to on for every 120 electrical degrees of the MG 80

That is, for every 120 electrical degrees, two of the three-phase command duties based on the two-phase modulation are determined to enable a sinusoidal line-to-line voltage to be generated while the remaining phase command duty is fixed to the minimum value of zero.

The pulse pattern modulation mode is configured to select one switching pulse pattern to be applied to each switching element in a plurality of prepared pulse switching patterns in accordance with, for example, the modulation factor of the inverter 62 and RPM-torque characteristics of the MG 80.

The rectangular modulation mode is configured to generate a switching pulse pattern for each switching element such that the ratio of on duration to an off duration for the corresponding switching element are set to 1:1.

Executing a selected one of the above modulation modes enables the switching pulse signals to be generated for the respective switching elements 63 to 68; each of the switching pulse signals includes a duty factor. The duty factor for a switching element represents a controllable ratio, i.e. percentage, of an on duration of the switching element to a total duration of a switching cycle. That is, the modulator 61 individually performs on-off switching operations of the switching elements 63 to 68 in accordance with the respective switching pulse signals to thereby convert the smoothed DC voltage Vdc into controlled three-phase AC voltages to be applied to the respective three-phase windings 81, 82, and 83. In particular, the modulator 61 complementarily turns on upper- and lower-arm switching elements of each pair while deadtimes during which the upper- and lower-arm switching elements of each pair are simultaneously turned off are ensured. Introducing the deadtimes prevents the upper and lower-arm switching elements of each pair from being simultaneously on, thus preventing an overcurrent from flowing through the upper- and lower-arm switching elements.

The on-off switching operations of the switching elements 63 to 68 enable output torque of the MG 80 generated based on the applied three-phase AC voltages to follow the request torque Trq.

The MG control apparatus 201 additionally includes a temperature sensor 74 for measuring a temperature T_sns of the current sensor 70, a temperature sensor 75 for measuring a temperature T_sns of the angle sensor 85, a temperature sensor 76 for measuring a temperature of the inverter 62 as an inverter temperature T_inv, and a temperature sensor 78 for measuring a temperature of the MG 80 as a MG temperature T_mg. Although the same reference characters T_sns are used to represent the temperatures of the respective sensors 74 and 85, the temperatures of the respective sensors 74 and 85 can be naturally identical to each other or different from each other.

For example, if the switching elements 63 to 68 and the diodes D are mounted to a circuit board so as to be packaged, the temperature sensor 76 is mounted to the circuit board. The temperature sensor 76 is configured to measure the inverter temperature T_inv as a temperature of each switching element 63 to 68. For example, the temperature sensor 76 can be arranged to be close to the switching elements 63 to 68, and to measure the ambient temperature around the switching elements 63 to 68 as the inverter temperature T_inv. The MG control apparatus 201 can include temperature-sensitive elements, such as temperature-sensitive diodes, and the temperature-sensitive elements can be configured to measure the respective switching elements 63 to 68.

The angular velocity calculator 86 temporally differentiates the electrical angle θ to thereby calculate an electrical angular velocity ω. The electrical angular velocity ω can also be simply as an angular velocity ω.

The magnetic flux estimator 41 is configured to calculate a magnetic flux estimate $\phi_{est}$ of magnetic flux of the permanent magnet unit 80a2 in accordance with input parameters input thereto. To the magnetic flux estimator 41 according to the first embodiment, the angular velocity ω, the d- and q-axis currents Id and Iq, and the d-axis command voltage Vq* are input as the input parameters; these input parameters input to the magnetic flux estimator 41 will also be referred to as flux estimation parameters.

The magnetic flux estimator 41 is configured to calculate the magnetic flux estimate $\phi_{est}$ of the magnetic flux of the permanent magnet unit 80a2 in accordance with the following equation (1):

$$\phi_{est} = \frac{Vq^* - (Rm \times Iq + \omega \times Ld \times Id)}{\omega} \quad (1)$$

where:

Rm represents the resistance of each phase winding, referred to as a winding resistance Ld represents the inductance in the d-axis, referred to as a d-axis inductance Lq represents the inductance in the q-axis, referred to as a q-axis inductance Note that the equation (1) can be derived from the following d- and q-axis voltage equations (1A):

$$Vd = -\omega \times Lq \times Iq + Rm \times Id$$

$$Vq = \omega \times Ld \times Id + Rm \times Iq + \omega \times \phi_{est} \quad (1A)$$

How the magnetic flux estimator 41 calculates the magnetic flux estimate will be described later.

Reference characters Id, Iq are used to represent the respective d- and q-axis currents, and, if d- and q-axis currents are clearly identified as values obtained based on the three-phase currents Iu, Iv and Iw measured by the current sensor 70, reference characters Id_sns, Iq_sns can be used to represent the respective d- and q-axis currents, i.e. d- and q-axis current measurements. Even if the reference characters Id, Iq are used to represent the respective d- and q-axis currents, the d- and q-axis currents can be respectively understood as the d- and q-axis current measurements as long as the d- and q-axis currents are clearly recognized as the d- and q-axis current measurements based on the descriptions of the specification and corresponding figures.

Note that the method of estimating the magnetic flux of the permanent magnet unit of a motor based on plural inputs, i.e. input parameters, is disclosed in and disclosed in Japanese Patent Publication No. 2943657. However, there is a possibility of an estimation error between the magnetic flux estimated based on the plural inputs and actual magnetic flux. For example, if current sensors are used to measure information correlating with the d- and q-axis currents, the delay in response of each current sensor may cause an estimation error between the estimated magnetic flux and the actual magnetic flux.

For addressing such an estimation error, let us consider a measure that individually corrects the respective input parameters to reduce the estimation error. This measure however may increase the calculation load required to individually correct the input parameters.

From this viewpoint, the present embodiment focuses on the matter that a magnetic-flux estimation error, which is finally generated based on the combination of errors of the input parameters, is uniquely determined according to the operating conditions of the MG 80. That is, the MG control apparatus 201 provides, as a component for calculating an estimation error correction $\phi_{comp}$ of a magnetic-flux estimation based on the operating conditions of the MG 80, the error correction outputting unit 50. The MG control apparatus 201 also provides, as a component for correcting the magnetic flux estimate $\phi_{est}$ based on the estimation error correction $\phi_{comp}$, the corrector 55.

The error correction outputting unit 50 has map information in data-table format, in mathematical expression format, and/or program format stored in, for example, the memory 100b. The map information includes information indicative of a relationship between values of the estimation error correction $\phi_{comp}$ and corresponding values of each parameter correlating with the operating conditions of the MG 80. That is, the error correction outputting unit 50 is configured to output a selected value of the estimation error correction $\phi_{comp}$ corresponding to input values of the parameters when the input values of the input parameters are input thereto. The parameters correlating with the operating conditions of the MG 80 will be referred to as operating condition parameters. The operating condition parameters enable errors of the flux estimation parameters input to the magnetic flux estimator 41 to be estimated.

The first embodiment is configured such that the request torque Trq*, the angular velocity ω, an MG-related temperature indicative of each of the temperatures T_sns, T_inv, and T_mg, and the DC voltage Vdc are input to the error correction outputting unit 50 as the operating condition parameters. Note that the DC voltage Vdc is used in the first and second embodiments, but not used in the third embodiment. In place of the request torque Trq*, an output torque measurement measured by a torque sensor can be used.

The corrector 55 is configured to add the estimation error correction $\phi_{comp}$ output from the error correction outputting unit 50 to the magnetic flux estimate $\phi_{est}$ to thereby output a corrected magnetic flux estimate $\phi_{est}\#$. The corrected magnetic flux estimate $\phi_{est}\#$ can be for example used to determine whether demagnetization or an increase of magnetization of the permanent magnet unit 80a2 has occurred.

Figure 3:
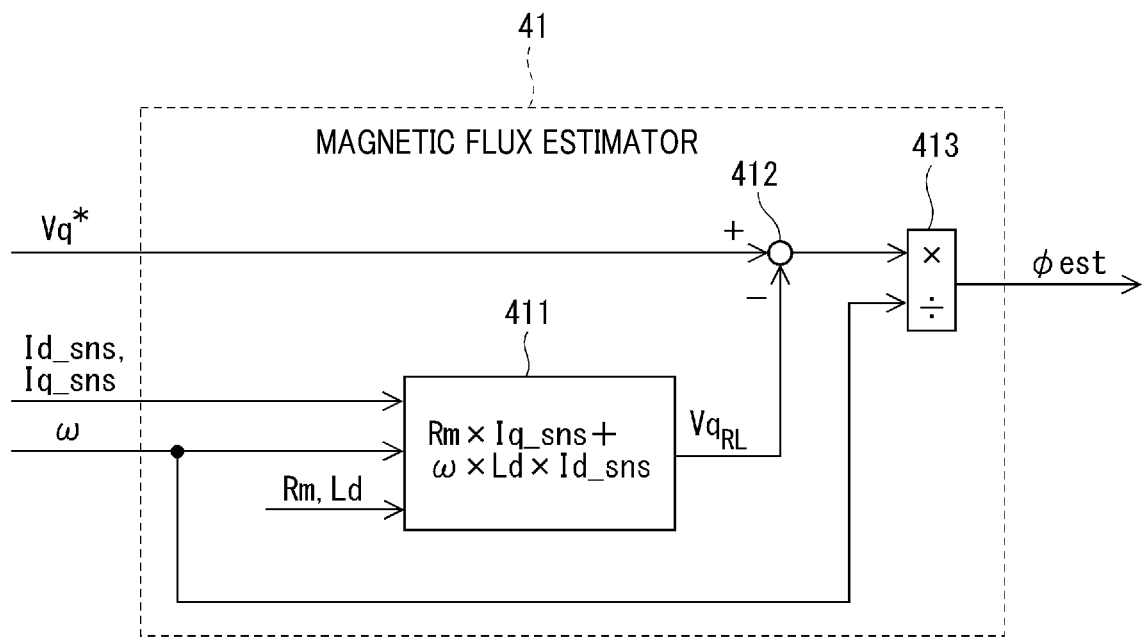
FIG. 3 is a block diagram schematically illustrating a magnetic flux estimator illustrated in FIG. 2.

FIG. 3 schematically illustrates an example of the structure of the magnetic flux estimator 41 according to the first embodiment. The magnetic flux estimator 41 includes an RL term calculator 411, a subtractor 412, and a divider 413. To the RL term calculator 411, the d- and q-axis current measurements Id_sns and Iq_sns and the angular velocity ω are input. Note that, at the right side of the equation (1), the term (Rm×Iq+ω×Ld×Id), which is subtracted from the q-axis command voltage Vq*, is defined as an RL term $V_{qRL}$ of a q-axis voltage. The RL term $V_{qRL}$ of the q-axis voltage represents the sum of the Rm term and the L term in the q-axis voltage equation (1A).

The RL term calculator 411 has stored RL term information in map format, mathematical expression format, and/or program format stored in, for example, the memory 100b representing the following equation (2.1):

$$V_{qRL} = Rm \times Iq\_sns + \omega \times Ld \times Id\_sns \qquad (2.1)$$

Then, the RL term calculator 411 calculates the RL term $V_{qRL}$ of the q-axis voltage in accordance with the Rl term information stored therein and the input parameters of the angular velocity ω and the d- and q-axis current measurements Id_sns and Iq_sns.

The subtractor 412 subtracts the RL term $V_{qRL}$ of the q-axis voltage from the q-axis command voltage Vq* to thereby output a result value, and the divider 413 divides the result value output from the subtractor 412 by the angular velocity ω, thus calculating the magnetic flux estimate $\phi_{est}\#$ in accordance with the equation (1). These calculations by the subtractor 412 and the divider 413 can be expressed by the following equation (2.2):

$$\phi_{est} = \frac{Vq^* - V_{qRL}}{\omega} \qquad (2.2)$$

Figure 4:
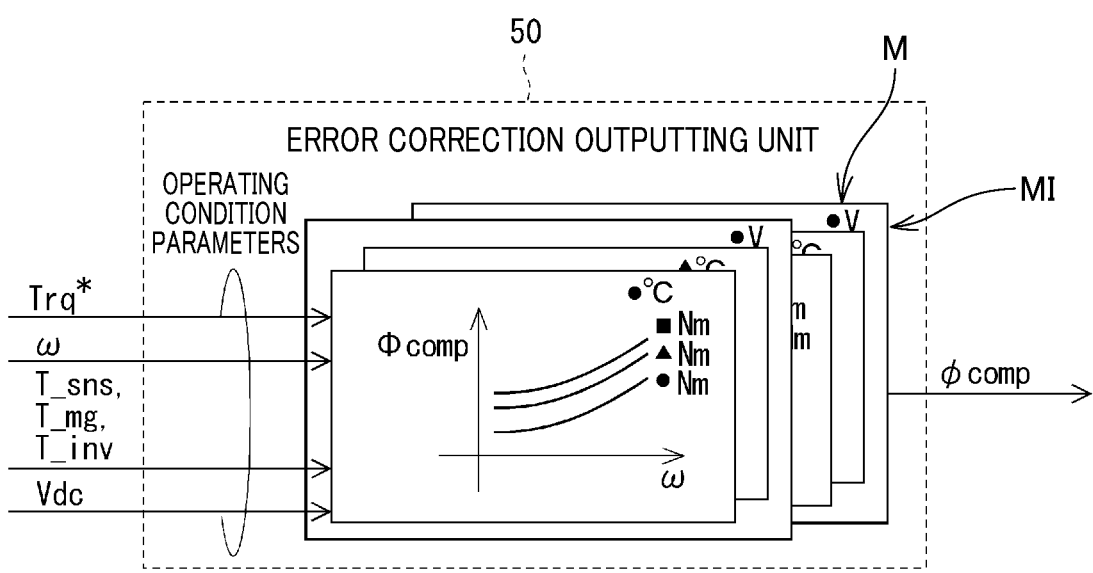
FIG. 4 is a block diagram schematically illustrating an error correction outputting unit illustrated in FIG. 2.

As illustrated in FIG. 4, the error correction outputting unit 50 has map information MI in data-table format, in mathematical expression format, and/or program format stored in, for example, the memory 100b. The map information MI includes information indicative of a relationship between values of the estimation error correction $\phi_{comp}$ and corresponding values of each operating condition parameter as its inputs, i.e. its arguments. The map information MI according to the first embodiment can be commonly used for the second and third embodiments as long as the DC voltage Vdc is eliminated from the operating condition parameters.

For example, the map information MI is comprised of plural maps M illustrated in, for example, graph format. Each map M has a variable of the estimation error correction $\phi_{comp}$ as its vertical axis; the estimation error correction $\phi_{comp}$ is reproducible for every operating condition of the MG 80. Each map M has the variable of the estimation error correction $\phi_{comp}$ as a function of 1 The variable of the angular velocity ω
2. The variable of the request torque Trq* [Nm]
3. A corresponding one of the values of the MG-related temperature
4. A corresponding one of the DC voltage Vdc [V]

That is, the error correction outputting unit 50 selects one of the maps M corresponding to the value of the DC voltage Vdc and a value of the MG-related temperature, and extracts a value of the estimation error correction $\phi_{comp}$ corresponding to a value of each of the angular velocity co and the request torque Trq*.

That is, the MG control apparatus 201 according to the first embodiment is configured not to correct each of the operating condition parameters input thereto, but to calculate the estimation error correction $\phi_{comp}$ that collectively corrects a magnetic-flux estimation error based on the combinations of the errors of the operating condition parameters using the map information MI. This therefore enables the calculation load and calculation capacity required to calculate the estimation error correction $\phi_{comp}$ to be reduced.

In addition, the error correction outputting unit 50 cancels out reproducible magnetic-flux estimation errors based on the variations of the respective operating condition parameters, thus increasing the accuracy of estimating the magnetic flux. The MG control apparatus 201 is configured to use the operating condition parameters to calculate the estimation error correction $\phi_{comp}$. This configuration therefore uniquely identifies a magnetic-flux estimation error based on the combinations of the errors of the operating condition parameters, and cancels out the uniquely identified magnetic-flux estimation error using a corresponding value of the estimation error correction $\phi_{comp}$.

Next, the following describes the technological meaning of each of the operating condition parameters in detail. As described above, the error correction outputting unit 50 is configured to output the estimation error correction $\phi_{comp}$ using, as its arguments, at least the velocity ω and the request torque Trq*. Note that the request torque Trq* can be replaced with the output torque of the MG 80, and the command or actual d- and q-axis currents have one-to-one correspondence with the torque of the MG 80 while the MG 80 is in a normal condition.

For these reasons, the following describes the reasons why the magnetic flux estimation error is uniquely determined based on (1) A parameter related to the angular velocity ω of the MG 80, which is referred to as an angular-velocity parameter of the MG 80

(2) Parameters related to the currents, such as the d- and q-axis currents, flowing in the MG 80, which will be referred to as current parameters of the MG 80

(3) A parameter related to the output torque of the MG 80 or the request torque Trq* therefor, which will be referred to as a torque parameter of the MG 80

The current parameters and the torque parameter can also be collectively referred to as current/torque parameters.

If the MG 80 is not in a normal condition, so that the command or actual d- and q-axis currents do not have one-to-one correspondence with the torque of the MG 80, the error correction outputting unit 50 is configured to preferably use the command or actual d- and q-axis currents as the operating condition parameters to calculate the estimation error correction $\phi_{comp}$.

Angular-Velocity Parameter and Current/Torque Parameters

In the right side of the equation (1), the winding resistance Rm, the d-axis inductance Ld, and the q-axis inductance Lq are predetermined machine constant parameters of the MG 80 used to calculate the magnetic flux estimate of the permanent magnet unit 80a2, so that the values of the winding resistance Rm, the d-axis inductance Ld, and the q-axis inductance Lq are unchanged. In addition, the operating condition parameters ω, Id, Iq, and Vq are variable parameters used to calculate the magnetic flux estimate of the permanent magnet unit 80a2, and actual values of the operating condition parameters ω, Id, Iq, and Vq are determined based on the angular-velocity parameter and the current/torque parameters of the MG 80. That is, the value of the operating condition parameter ω is determined based on a value of the angular-velocity parameter, and the values of the operating condition parameters Id and Iq are determined based on the values of the respective current parameters. The value of the operating condition parameter Vq is uniquely determined based on the value of the angular-velocity parameter, the values of the current parameters, and the machine constant parameters Rm and Ld in the following q-axis voltage equation (3):

$$Vq = \omega \times Ld \times Id + Rm \times Iq + \omega \times \phi \quad (3)$$

where φ represents actual magnetic flux of the permanent magnet unit 80a2.

Strictly speaking, the machine constant parameters Rm and Ld each have temperature dependence, so that the actual values of the machine constant parameters Rm and Ld may be shifted from their original constant values depending on their temperature changes. This will be described later. Strictly speaking, the inductance Ld has current dependency, so that the inductance Ld can be treated as one of the operating condition parameters.

Additionally, magnetic flux of the permanent magnet unit 80a2 while the MG 80 is in a predetermined standard state is defined as a standard magnetic flux. The MG 80 being in the standard state is defined as the MG 80 having a temperature within a predetermined standard temperature range.

For example, demagnetization of the permanent magnet unit 80a2 may cause the actual magnetic flux of the permanent magnet unit 80a2 to change from the standard magnetic flux. This may result in the value of the operating condition parameter Vq being changed from the value determined based on the value of the angular-velocity parameter and the values of the current parameters set forth above. That is, change of the actual magnetic flux of the permanent magnet unit 80a2 from the standard magnetic flux may cause the magnetic-flux estimation error to be varied. This therefore may result in the above estimation-error reduction effect, which is obtained from correction of the magnetic flux estimate based on the angular-velocity parameter and the current/torque parameters, being slightly reduced. However, in this case, the above estimation-error reduction effect remains sufficiently as compared with a case of no correction of the magnetic flux estimate.

Next, the following considers the delay in response of each sensor. The angular velocity ω has little influence from the delay in response of the angle sensor 85, so that the angular velocity measurement measured by the angle sensor 85 is substantially equal to the actual value of the angular velocity ω. Note that, strictly speaking, the angular velocity measurement measured by the angle sensor 85 may be shifted from the actual value of the angular velocity ω due to the delay in response of the angle sensor 85 while, for example, the angular velocity ω is rapidly changing. During such a rapid change of the angular velocity ω, various other factors may cause the magnetic-flux estimation error to increase, so that the magnetic flux estimator 41 can be configured to stop calculation of the magnetic flux estimate. The present embodiment therefore eliminates such a rapid change of the angular velocity ω from consideration.

On the other hand, each of the measurements Vq, Iq, and Id measured by a corresponding sensor has an influence from the delay in response of the corresponding sensor, and a deviation of each of the measurements Vq, Iq, and Id from the corresponding actual value depends on the angular velocity ω. The following describes how the deviation of each of the measurements Vq, Iq, and Id from the corresponding actual value depends on the angular velocity ω.

The upper part of FIG. 5 schematically illustrates that the current measurement of each phase current Iu, Iv, and Iw is delayed from the corresponding actual phase current due to the delay in response of the current sensor 70. This causes the phase of the current vector of the d- and q-axis current measurements in the dq coordinate system, which are obtained by the dq converter 29 from the three-phase current measurements, to delay, i.e. deviate, from the phase of the actual current vector of the actual d- and q-axis currents (see the middle part of FIG. 5). When this phase deviation is related to the angular velocity ω, the larger the angular velocity ω in the positive direction is, the greater the degree of the phase deviation in the negative direction is. That is, the deviation of each of the current measurements Iq and Id from the corresponding actual value is determined based on the angular velocity ω.

Similarly, there is a deviation of each of the voltage measurements from the corresponding actual value in accordance with the angular velocity ω, and there is also a deviation of the angle measurement from the corresponding actual angle value is determined based on the angular velocity ω.

Note that, even if the d- and q-axis command currents Id* and Iq* are used for calculating the magnetic flux estimate in place of the d- and q-axis current measurements Id_sns and Iq_sns, the d- and q-axis command currents Id* and Iq* have an influence from the delay in response of the current sensor 70 during the process of causing each of the d- and q-axis command currents Id* and Iq* to follow the corresponding actual value. The d- and q-axis command currents Id* and Iq* can be therefore handled in the same manner as the current sensor measurements.

MG-Related Temperature Parameter

The following describes the reason why the error correction $\phi_{comp}$ is calculated based on an MG-related temperature parameter indicative of each of the temperatures T_sns, T_inv, and T_mg. Each of the current sensor 70 and the angle sensor 85 has temperature characteristics depending on the corresponding sensor temperature T_sns. Each of the winding resistance Rm and the inductances Ld and Lq of the machine constant parameters has temperature characteristics depending on the MG temperature T_mg.

In addition, the modulator 61 complementarily turns on upper- and lower-arm switching elements of each pair while deadtimes during which the upper- and lower-arm switching elements of each pair are simultaneously turned off are ensured.

The deadtimes become a key factor for a voltage deviation between at least one command voltage and a corresponding actual voltage. A DC voltage drop across each switching element 63-68 also becomes a key factor for the voltage deviation between at least one command voltage and a corresponding actual voltage. The deadtimes have temperature characteristics depending on the inverter temperature T_inv, and the DC voltage drops across each switching element 63-68 also have temperature characteristics depending on the inverter temperature T_inv.

For these reasons, the error correction outputting unit 50 is configured to generate the estimation error correction $\phi_{comp}$ in accordance with each of the temperatures T_sns, T_inv, and T_mg, making it possible to correct the magnetic-flux estimation error suitably for the temperature characteristics of each of the above factors.

Hereinafter, the voltage deviation between at least one command voltage and a corresponding actual voltage will be referred to simply as a voltage deviation.

The following successively describes the DC voltage drop across each switching element 63-68, and the deadtimes.

The d- and q-axis voltage errors between the d- and q-axis command voltages Vd* and Vq* and the respective actual d- and q-axis voltages Vd and Vq are due to the DC voltage drop across each of the switching elements 63-68.

The DC voltage drop across a switching element includes a voltage drop Vf across the flyback diode, and a voltage drop Vce across the IGBT of the switching element. If an IGBT and a corresponding flyback diode D of each switching element can be modularized as a power module, the DC voltage drop across the power module can be used as the DC voltage drop of the corresponding switching element.

Figure 6A:
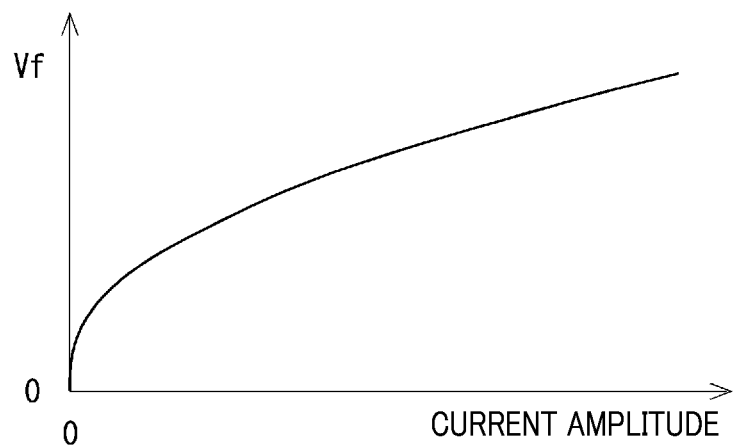
FIG. 6A is a graph schematically illustrating a relationship between a voltage drop across a flyback diode of each switching element and a current amplitude of the switching element according to the first embodiment.
Figure 6B:
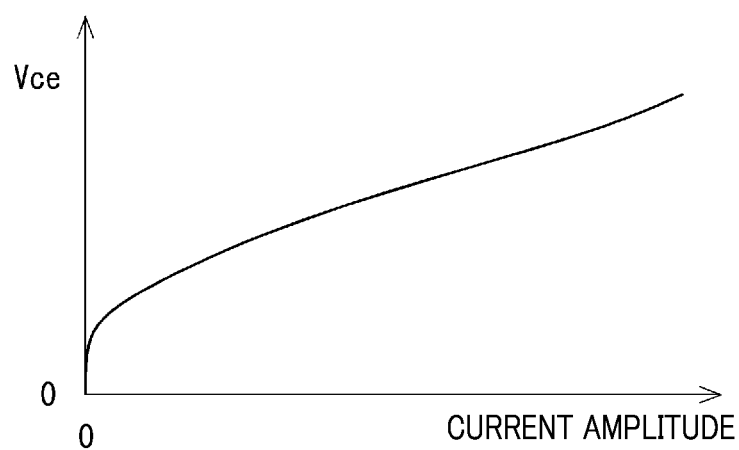
FIG. 6B is a graph schematically illustrating a relationship between a voltage drop across each switching element and a current amplitude of the switching element according to the first embodiment.

FIG. 6A schematically illustrates that the voltage drop Vf across the flyback diode of each switching element 63 to 68 has a positive correlation with the current amplitude of the corresponding switching element, and similarly FIG. 6B schematically illustrates that the voltage drop Vce across the IGBT of each switching element 63 to 68 has a positive correlation with the current amplitude of the corresponding switching element. Note that, because the characteristic curve between the voltage drop Vf across the flyback diode of each switching element 63 to 68 and the current amplitude of the corresponding switching element (see FIG. 6A) is substantially similar to the voltage drop Vce across the IGBT of each switching element 63 to 68 and the current amplitude of the corresponding switching element (see FIG. 6B), it is possible to use one of the voltage drop Vf and the voltage drop Vce as the DC voltage drop across each switching element 63-68. That is, the DC voltage drop across each switching element 63-68 depends on the current amplitude of the corresponding switching element.

The d- and q-axis voltage errors are also due to the deadtimes of the switching elements 63 to 68.

As described later, an actual deadtime for each switching element is defined by the sum of a command deadtime, an on delay, and off delay of the corresponding switch. For this reason, the temperature characteristics of the actual deadtime have the combination of the temperature characteristics of the on delay, and the temperature characteristics of the off delay.

Figure 7A:
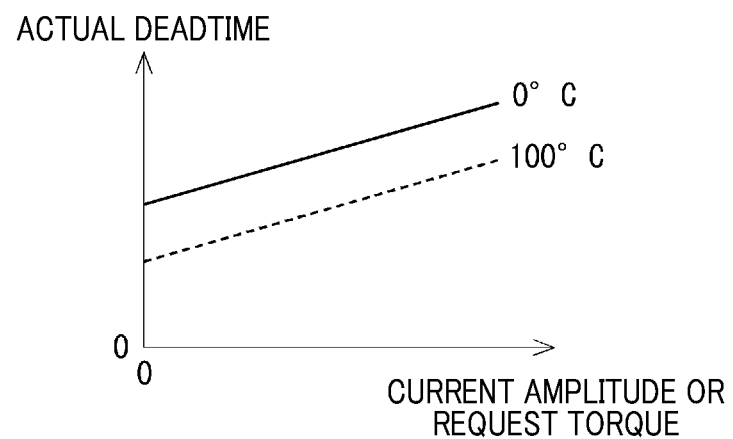
FIG. 7A is a graph schematically illustrating temperature characteristics of an actual deadtime relative to either a current amplitude of the switching element or request torque according to the first embodiment.

FIG. 7A schematically illustrates the temperature characteristic curves of the actual deadtime of a selected one of the switching elements 63-68 relative to change of the current amplitude of the selected one of the switching elements 63-68 and/or the request torque Trq*. Specifically, the actual deadtime for each switching element 63-68 at the inverter temperature T_inv of 100° C. at any current amplitude or torque request Trq* is smaller than the actual deadtime for the corresponding switching element 63-68 at the inverter temperature T_inv of 0° C. at the same current amplitude or torque request Trq*. In addition, FIG. 7B illustrates that the temperature characteristic curves of the DC voltage drop across each switching element relative to the current amplitude or the request torque Trq* changes depending on the inverter temperature T_inv.

Figure 7B:
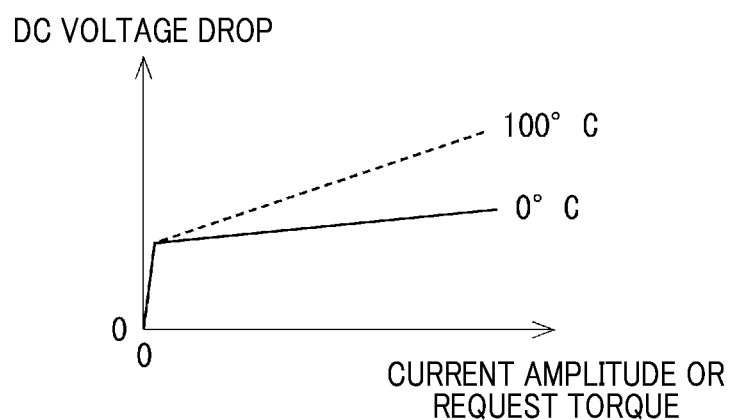
FIG. 7B is a graph schematically illustrating temperature characteristics of an off delay relative to either a current amplitude of the switching element or request torque according to the first embodiment.

FIG. 7B shows that (1) The smaller the current amplitude or the request torque Trq* is, the smaller the difference between the DC voltage drop at the inverter temperature T_inv of 100° C. and the DC voltage drop at the inverter temperature T_inv of 0° C. is (2) The larger the current amplitude or the request torque Trq* is, the larger the difference between the DC voltage drop at the inverter temperature T_inv of 100° C. and the DC voltage drop at the inverter temperature T_inv of 0° C. is.

DC Voltage Parameter

Next, the following describes the reason why the error correction $\phi_{comp}$ is calculated based on a parameter related to the DC voltage Vdc input to the inverter 62, which will be referred to as a DC voltage parameter of the MG 80.

The DC voltage parameter correlates with the deadtimes each represent a period during which the upper- and lower-arm switching elements of each phase are simultaneously turned off set forth above. Although the detailed descriptions of the deadtimes are omitted because the deadtimes are well-known technologies, the following simply describes the deadtimes with reference to FIGS. 8A and 8B.

Figure 8A:
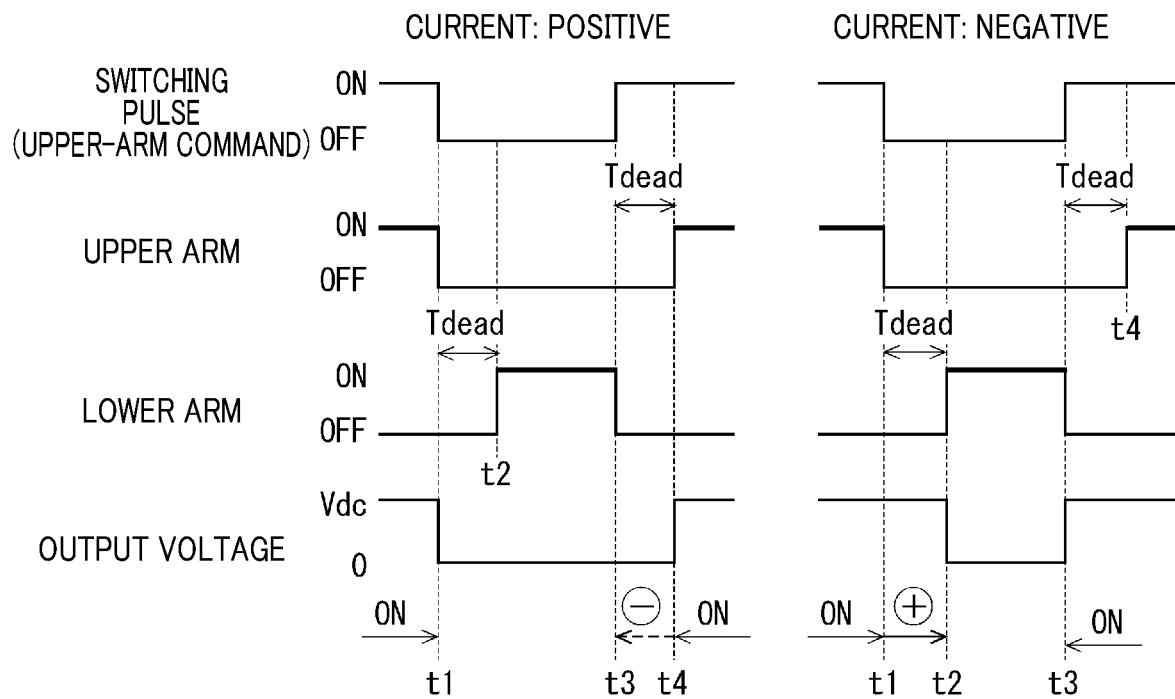
FIG. 8A is a joint timing chart schematically illustrating how upper- and lower-arm switching elements for a selected phase are driven based on a switching pulse according to the first embodiment.

FIG. 8A illustrates that a switching pulse is output from the modulator 61 as an upper-arm command to the target upper-arm switching element of a selected phase. Note that FIG. 8A focuses on the selected phase of the inverter 62 between the battery 10 and the load (MG) 80 for simply description of the deadtimes.

The switching pulse is controlled to fall down at time t1, and thereafter rises up at time t3, so that the target upper-arm switching element is turned off at the time t1, and thereafter turned on at time t4 when a deadtime Tdead has elapsed since the time t3. The target lower-arm switching element of the selected phase is turned on at time t2 when the deadtime Tdead has elapsed since the time t1, and thereafter turned off at the time t3.

When a current is flowing through the target upper-arm switching element in a positive direction from the collector to the emitter, the output voltage of the inverter 62 becomes the DC voltage Vdc upon the upper-arm switching element being turned on, and becomes zero upon the upper-arm being turned off. This results in the zero-voltage period of the output voltage from the time t3 to the time t4 being added to the normal zero-volt period of the output voltage corresponding to the off period of the switching pulse. In addition, when a current is flowing through the target lower-arm switching element in a negative direction from the emitter to the collector, the output voltage of the inverter 62 becomes the DC voltage Vdc upon the target lower-arm switching element being turned off, and becomes zero upon the lower-arm being turned on. This results in the Vdc period of the output voltage from the time t1 to the time t2 being added to the normal Vdc period of the output voltage corresponding to the on period of the switching pulse.

Figure 8B:
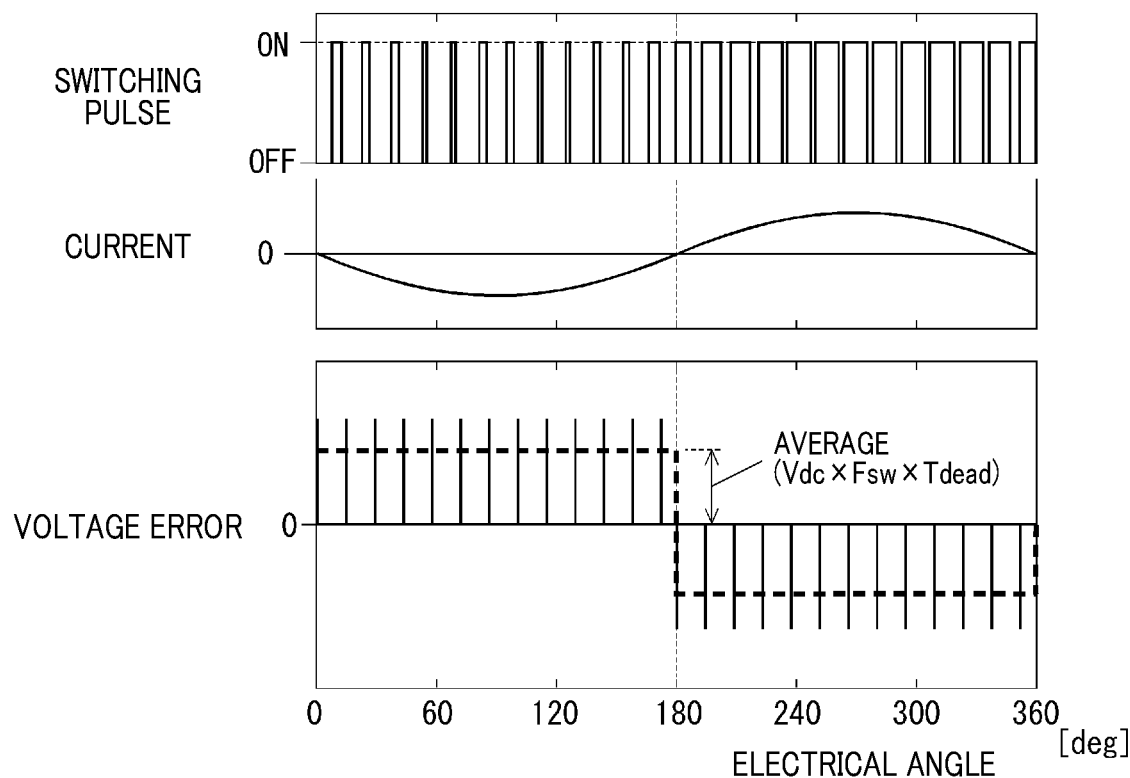
FIG. 8B is a joint timing chart schematically illustrating an example of the relationships among the switching pulse for a selected phase, a phase current of the selected phase, and d- and q-axis voltage errors due to respective dead times during a three-phase modulation mode in PWM control according to the first embodiment.

FIG. 8B schematically illustrates the relationships among the switching pulse for a selected phase, a phase current of the selected phase, and the d- and q-axis voltage errors due to the respective deadtimes during the three-phase modulation in the PWM control. A rectangular wave signal based on the average of the voltage errors is illustrated by a dashed line, and the rectangular waveform signal, which will be referred to as a voltage error signal, has an amplitude A determined based on the product of the DC voltage Vdc input to the inverter 62, a switching frequency Fsw of the switching elements 63-68, and the deadtime Tdead, which is expressed by the equation "A=Vdc×Fsw×Tdead".

In addition, when the modulator 61 performs the three-phase modulation in the PWM control, d- and q-axis deadtime correction voltages Vd_comp$_{DT}$ and Vq_comp$_{DT}$ for correcting the voltage error signal can be expressed, based on a current phase βd of a current vector Idq relative to the d-axis (see FIG. 5) by the following equations (4):

$$\text{Vd\_comp}_{DT} = -Vdc \times Fsw \times Tdead \times \frac{2\sqrt{6}}{\pi} \cdot \cos(\beta d)$$

$$\text{Vq\_comp}_{DT} = -Vdc \times Fsw \times Tdead \times \frac{2\sqrt{6}}{\pi} \cdot \sin(\beta d)$$

(4)

For the reasons set forth above, the magnetic flux estimator 41 is preferably configured to correct the d- and q-axis command voltages Vd* and Vq* based on the respective d- and q-axis deadtime correction voltages Vd_comp$_{DT}$ and Vq_comp$_{DT}$. However, if the above deadtime correction is omitted from the magnetic flux estimator 41, the remaining voltage deviation may cause a magnetic-flux estimation error due to the deadtimes. For this reason, the error correction outputting unit 50 is configured to reflect the d- and q-axis deadtime correction voltages Vd_comp$_{DT}$ and Vq_comp$_{DT}$ on the estimation error correction φ$_{comp}$, thus cancelling out the magnetic-flux estimation error due to the deadtimes. Specifically, as expressed by the equations (4), the voltage deviation due to the deadtimes is proportional to the DC voltage Vdc. For this reason, the error correction outputting unit 50 generates the estimation error correction φ$_{comp}$ based on variations of the DC voltage Vdc, making it possible to more suitably correct the magnetic-flux estimation errors.

Additionally, let us consider other variables except for the DC voltage Vdc in the equations (4). Because the switching frequency Fsw is basically determined in accordance with the angular velocity ω and the request torque Trq*, there is no need to add the switching frequency Fsw to the operating condition parameters for correcting the magnetic flux estimate. If the modulator 61 performs another modulation mode, such as the two-phase modulation mode or the pulse pattern modulation mode, except for the three-phase modulation mode, influences of the deadtimes on the magnetic flux estimate may be different from influences of the deadtimes on the magnetic flux estimates if the modulator 61 performs the three-phase modulation mode. However, because information indicative of the actual modulation mode selected by the modulator 61 is determined based on the angular velocity ω, the request torque Trq*, and the DC voltage Vdc, there is no need to add the information indicative of the actual modulation mode selected by the modulator 61 to the operating condition parameters for correcting the magnetic flux estimate.

The above descriptions show the technological meaning of each of the operating condition parameters according to the first embodiment. As described above, at least one of the operating condition parameters is configured to correlate with an error included in at least one of the flux estimation parameters used by the magnetic flux estimator 41 for calculating the magnetic flux estimate. In other words, the operating condition parameters include at least one parameter that enables errors of the flux estimation parameters to be estimated. The operating condition parameters can include at least one parameter that enables influences of errors of the flux estimation parameters to be determined. The above descriptions can be applied to the second and third embodiments.

Figure 9:
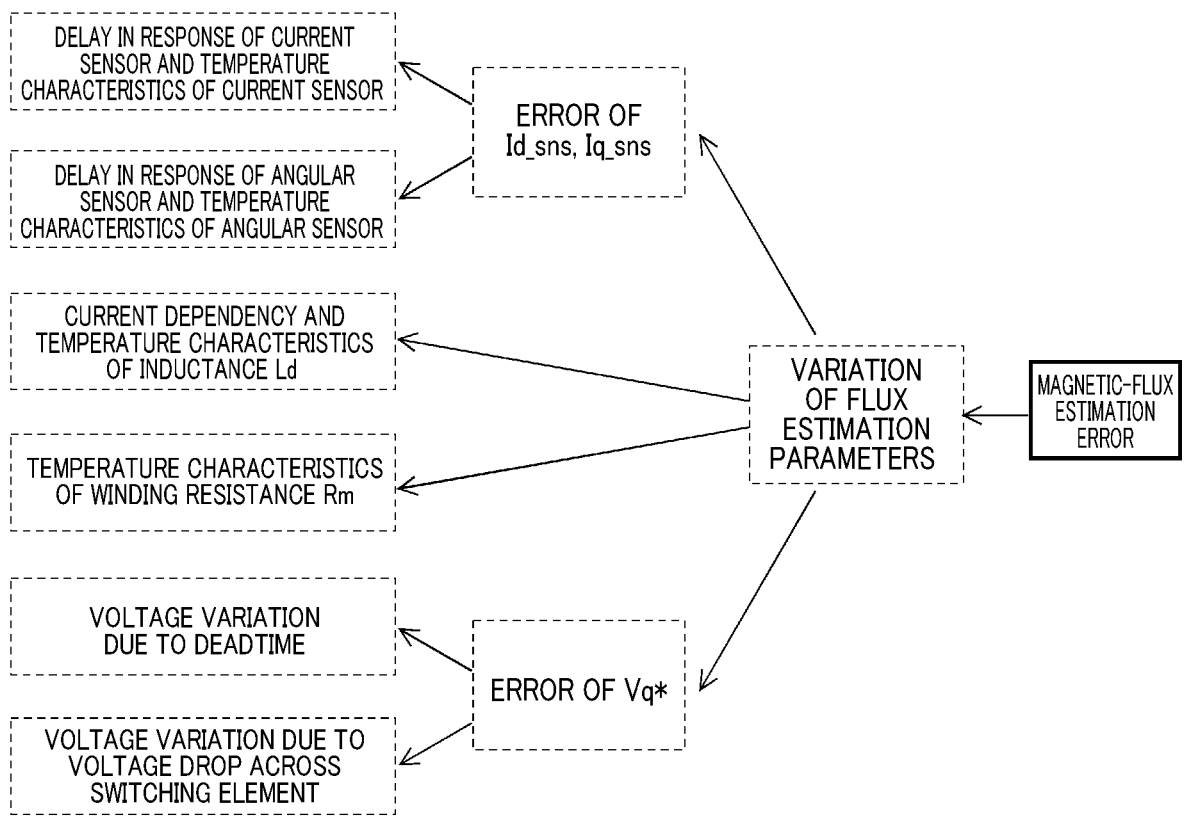
FIG. 9 is a factor analysis diagram of magnetic-flux estimation errors according to the first embodiment.
Figure 11:
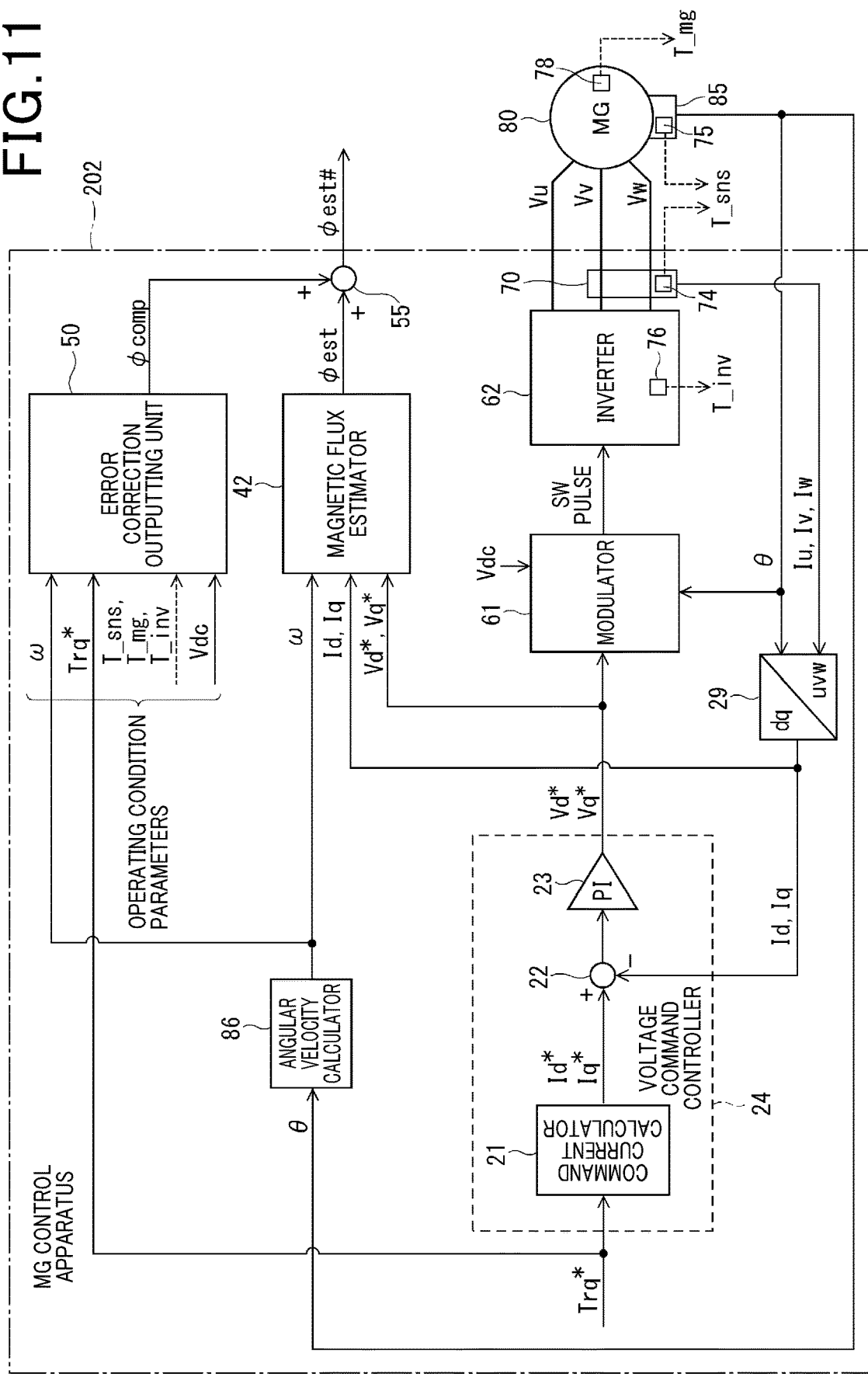
FIG. 11 is a block diagram schematically illustrating the structure of an MG control apparatus according to the second embodiment.

Next, the following describes, as a summary of the first embodiment, analysis of the factors of the magnetic-flux estimation errors, and the relationships between the factors of the magnetic-flux estimation errors and the operating condition parameters with reference to FIGS. 9 and 10.

FIG. 9 schematically illustrates items factors of the magnetic-flux estimation errors, and factors of variations of the flux estimation parameters.

That is, the variations of the flux estimation parameters are extracted as the at least one factor of the magnetic flux estimation errors.

The factors of the variations of the flux estimation parameters include (1) Errors of the d- and q-axis current measurements Id_sns and Iq_sns (2) The temperature characteristics and the current dependency of the d-axis inductance Ld (3) The temperature characteristics of the winding resistance Rm (4) An error of the d-axis command voltage Vq*

The factors of the errors of the d- and q-axis current measurements Id_sns and Iq_sns include (1) The temperature characteristics and the delay in response of the current sensor 70

(2) The temperature characteristics and the delay in response of the angle sensor 85

The factors of the error of the d-axis command voltage Vq* include (1) The voltage deviation due to the deadtimes (2) The voltage deviation due to the DC voltage drop across each switching element 63-68

The following provides supplementary descriptions of the other factors of the magnetic flux estimation errors, which are not shown in FIG. 9, and the reasons why the other factors are not shown in FIG. 9.

One of the other factors is the variations in the magnetic-flux estimation characteristics of the MG control apparatuses 20 due to their individual differences. In order to address the variations in the magnetic-flux estimation characteristics of the MG control apparatuses 20, each of the MG control apparatuses 20 can be configured to adjust the magnetic flux estimate φ$_{est}$ of the magnetic flux of the permanent magnet unit 80a2. The present embodiment however utilizes the magnetic flux estimate φ$_{est}$ of the magnetic flux of the permanent magnet unit 80a2 for each of all the MG control apparatuses 20 without using adjustment of the magnetic flux estimate φ$_{est}$ for each MG control apparatus 201.

Another one of the other factors include very small factors of the magnetic flux estimation errors resulting from a specific situation where the MG control apparatus 201 is used. For example, the very small factors include variations in the power supply voltage of each sensor, and error characteristics of at least one component of the MG control apparatus 201. The present embodiment however eliminates the very small factors from the factors extracted to be shown in FIG. 9, because there is a small advantage of improving the accuracy of calculating the magnetic flux estimate in such a specific situation.

FIG. 10 schematically illustrates the relationships between the factors of the magnetic-flux estimation errors, which are corrected by the error correction outputting unit 50, and the operating condition parameters.

Because the magnetic flux estimator 41 is configured to calculate the magnetic flux estimate φ$_{est}$ in accordance with the magnetic flux estimation equation (1) using the angular-velocity parameter, and the current/torque parameters, the magnetic-flux estimation errors due to the magnetic flux estimation equation depend on the angular-velocity parameter and the current/torque parameters.

The factors of the magnetic-flux estimation errors include
(1) Current sensor variations
(2) Angular sensor variations
(3) Inductance variations
(4) Winding resistance variations
(5) Voltage deviations due to deadtimes
(6) Voltage deviations due to the DC voltage drop across each switching element The angular-velocity parameter addresses the delay in response of the current sensor 70 as the "current sensor variations", and the delay in response of the angle sensor 85 as the "angle sensor variations".

The current/torque parameters address
1. The current dependency of the inductance Ld as the "inductance variations"
2. The amplitude and phase variations as the "voltage deviations due to deadtimes"
3. The amplitude and phase variations as the "voltage deviations due to the DC voltage drop across each switching element"

The MG-related temperature parameter addresses the temperature characteristics of each of the "current sensor variations", "angle sensor variations", "inductance variations", "voltage deviations due to deadtimes", and "voltage deviations due to the DC voltage drop across each switching element".

The DC voltage parameter addresses the amplitude variations as the "voltage deviations due to deadtimes".

Second Embodiment

The following describes the MG control apparatus 202 of the second embodiment with reference to FIGS. 11 to 14.

The MG control apparatus 202 includes a magnetic flux estimator 42 configured to calculate a magnetic flux estimate $\phi_{est}$ of magnetic flux of the permanent magnet unit 80a2 in accordance with input parameters input thereto.

To the magnetic flux estimator 42 according to the second embodiment, the angular velocity ω, the d- and q-axis currents Id and Id, i.e. the current measurements Id_sns and Iq_sns, and the d- and q-axis command voltages Vd* and Vq* are input as the flux estimation parameters. That is, to the magnetic flux estimator 42, the d- and q-axis currents Id and Iq, and the d- and q-axis command voltages Vd* and Vq*, i.e. an input power parameter is input.

The magnetic flux estimator 42 is configured to calculate the magnetic flux estimate $\phi_{est}$ of magnetic flux of the permanent magnet unit 80a2 in accordance with the magnetic flux estimation parameters including the input power parameter.

The operating condition parameters input to the error correction outputting unit 50 according to the second embodiment are the same as the operating condition parameters according to the first embodiment.

Figure 12:
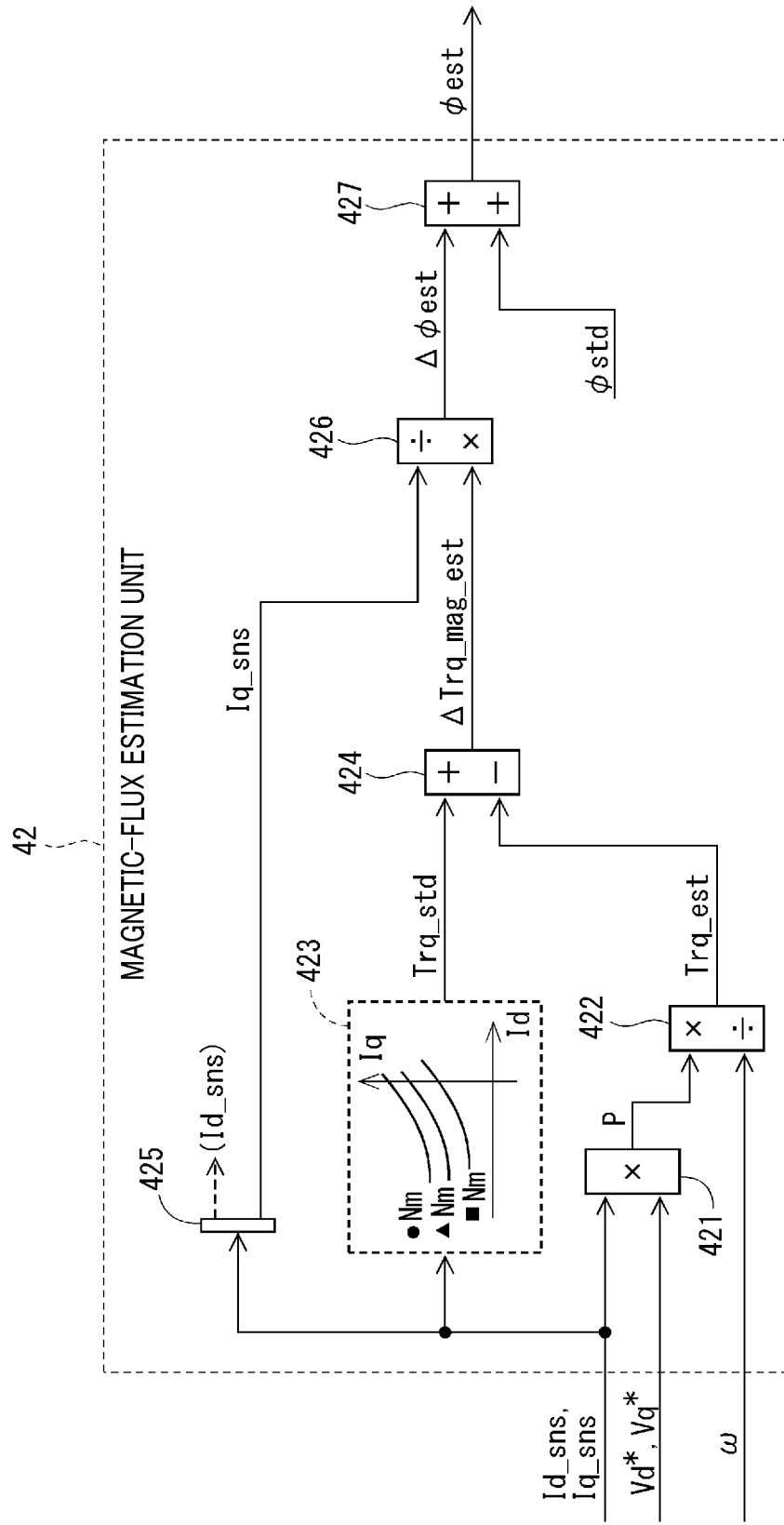
FIG. 12 is a block diagram schematically illustrating a magnetic flux estimator illustrated in FIG. 11.

FIG. 12 schematically illustrates an example of the structure of the magnetic flux estimator 42 according to the second embodiment. The magnetic flux estimator 42 includes a power calculator 421, a torque estimator 422, a standard torque estimator 423, a magnet torque deviation estimator 424, a q-axis current extractor 425, a magnetic-flux variation estimator 426, and a magnetic flux estimate calculator 427.

To the power calculator 421, the d- and q-axis current measurements Id_sns and Iq_sns and the d- and q-axis command voltages Vd* and Vq* are input. The angular velocity ω is input to the torque estimator 422. The d- and q-axis current measurements Id_sns and Iq_sns are also input to the reference torque estimator 423. The d- and q-axis current measurements Id_sns and Iq_sns are further input to the q-axis current extractor 425, so that the q-axis current measurement Iq_sns is extracted by the q-axis current extractor 425, and sent to the magnetic-flux variation estimator 426.

The power calculator 421 calculates input power P in accordance with the following equation (5.1):

$$P=Vd^*\times Id\_sns+Vq^*\times Iq\_sns \tag{5.1}$$

The torque estimator 422 calculates a torque estimation Trq_est in accordance with the following equation (5.2):

$$Trq\_est=P/\omega \tag{5.2}$$

The standard torque estimator 423 has stored standard-torque information in map format, mathematical expression format, and/or program format representing the following equation (5.3):

$$Trq\_st=\phi std\times Iq\_sns+(Ld-Lq)\times Id\_sns\times I\_sns \tag{5.3}$$

where φstd represents the standard magnetic flux.

That is, the equation (5.3) utilizes the standard magnetic flux φstd and inductances Ld and Lq. As described above, the standard magnetic flux φstd is defined as magnetic flux of the permanent magnet unit 80a2 while the MG 80 is in the predetermined standard state, i.e. has the temperature within the standard temperature range with no demagnetization of the permanent magnet unit 80a2. The standard torque Trq_std is defined as the sum of magnet torque by the permanent magnet unit 80a2, which is the first term of the right side of the equation (5.3), and reluctance torque of the interior permanent-magnet rotor core 80a1, which is the second term of the right side of the equation (5.3).

That is, in the equation (5.3), because the d-axis inductance Ld is usually unequal to the q-axis inductance Lq of the interior permanent-magnet rotor core 80a1, the second term of the right side of the equation (5.3) contributes as the reluctance torque to the standard torque Trq_std. If the MG 80 is designed as an SPMSM, because the d-axis inductance Ld is usually equal to the q-axis inductance Lq of the interior permanent-magnet rotor core 80a1, the second term of the right side of the equation (5.3) can be regarded as zero.

The magnet torque deviation estimator 424 calculates a deviation of the estimation torque Trq_est from the standard torque Trq_std in accordance with the following equation (5.4) to thereby calculate the deviation as a magnet torque deviation estimation ΔTrq_mag_est:

$$\Delta Trq\_mag\_std=Trq\_std-Trq\_est \tag{5.4}$$

The magnetic-flux variation estimator 426 calculates a magnetic-flux variation estimation $\Delta\phi_{est}$ in accordance with the following equation (5.5):

$$\Delta\phi_{est}=\Delta Trq\_mag\_std/Iq\_sns \tag{5.5}$$

The magnetic flux estimate calculator 427 adds the magnetic-flux variation estimation $\Delta\phi_{est}$ to the standard magnetic flux $\phi_{std}$, thus calculating the magnetic flux estimate $\phi_{est}$ in accordance with the following equation (5.6):

$$\phi_{est}=\phi_{std}+\Delta\phi_{est} \tag{5.6}$$

Figure 13:
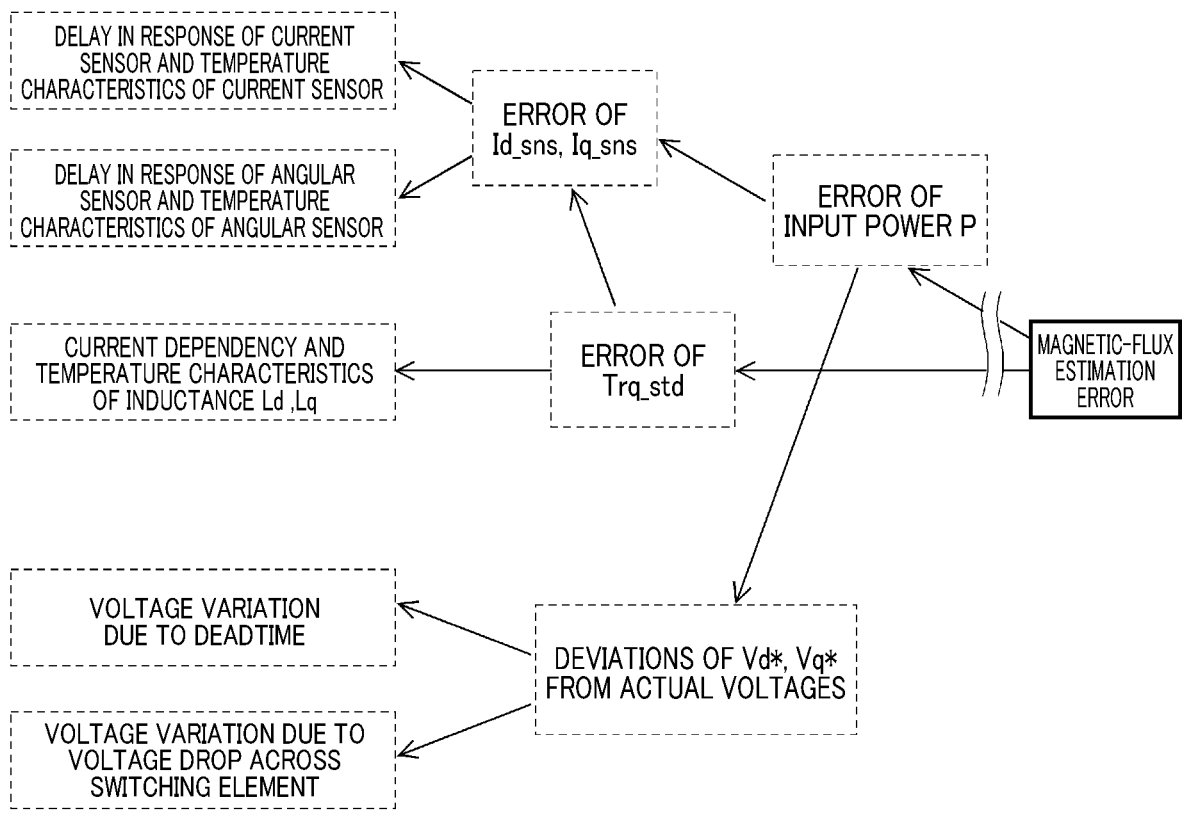
FIG. 13 is a factor analysis diagram of magnetic-flux estimation errors according to the second embodiment.

FIG. 13 schematically illustrates factors of the magnetic-flux estimation errors, and factors of variations of the flux estimation parameters.

An error of the input power P and an error of the standard torque Trq_std are extracted as the at least one factor of the magnetic flux estimation errors.

The factors of the error of the standard torque Trq_std include
(1) Errors of the d- and q-axis current measurements Id_sns and Iq_sns
(2) Deviations of the actual voltages Vd and Vq from the respective command voltages Vd* and Vq*
(3) The temperature characteristics and the current dependency of each of the d- and q-axis inductances Ld and Lq The errors of the d- and q-axis current measurements Id_sns and Iq_sns become the factor of the error of the standard torque Trq_std.

The factors of the errors of the d- and q-axis current measurements Id_sns and Iq_sns include
(1) The temperature characteristics and the delay in response of the current sensor 70
(2) The temperature characteristics and the delay in response of the angle sensor 85

The factors of the deviations of the actual voltages Vd and Vq from the respective command voltages Vd* and Vq* include
(1) The voltage deviation due to the deadtimes
(2) The voltage deviation due to the DC voltage drop across each switching element 63-68

FIG. 14 schematically illustrates the relationships between the factors of the magnetic-flux estimation errors, which are corrected by the error correction outputting unit 50, and the operating condition parameters according to the second embodiment.

The magnetic flux estimator 42 is configured to calculate the magnetic flux estimate $\phi_{est}$ in accordance with the magnetic flux estimation equation using the angular velocity ω and the input power P. Because the input power P can be calculated based on the combination of the currents Id and Iq and voltages Vd and Vq, or the combination of the torque of the MG 80 and the angular velocity ω, the magnetic-flux estimation errors due to the magnetic flux estimation equation depend on the angular-velocity parameter and the current/torque parameters.

The factors of the magnetic-flux estimation errors include
(1) Current sensor variations
(2) Angular sensor variations
(3) Voltage deviations due to deadtimes
(4) Voltage deviations due to the DC voltage drop across each switching element
(5) Inductance variations The angular-velocity parameter addresses the delay in response of the current sensor 70 as the "current sensor variations", and the delay in response of the angle sensor 85 as the "angle sensor variations".

The current/torque parameters address
1. The current dependency of each of the inductances Ld and Lq as the "inductance variations"
2. The amplitude variations as the "voltage deviations due to the DC voltage drop across each switching element"

The MG-related temperature parameter addresses the temperature characteristics of each of the "current sensor variations", "angle sensor variations", "voltage deviations due to deadtimes", "voltage deviations due to the DC voltage drop across each switching element", and "inductance variations".

The DC voltage parameter addresses the amplitude variations as the "voltage deviations due to deadtimes".

Third Embodiment

The following describes the MG control apparatus 203 of the third embodiment with reference to FIGS. 15 to 18.

Figure 15:
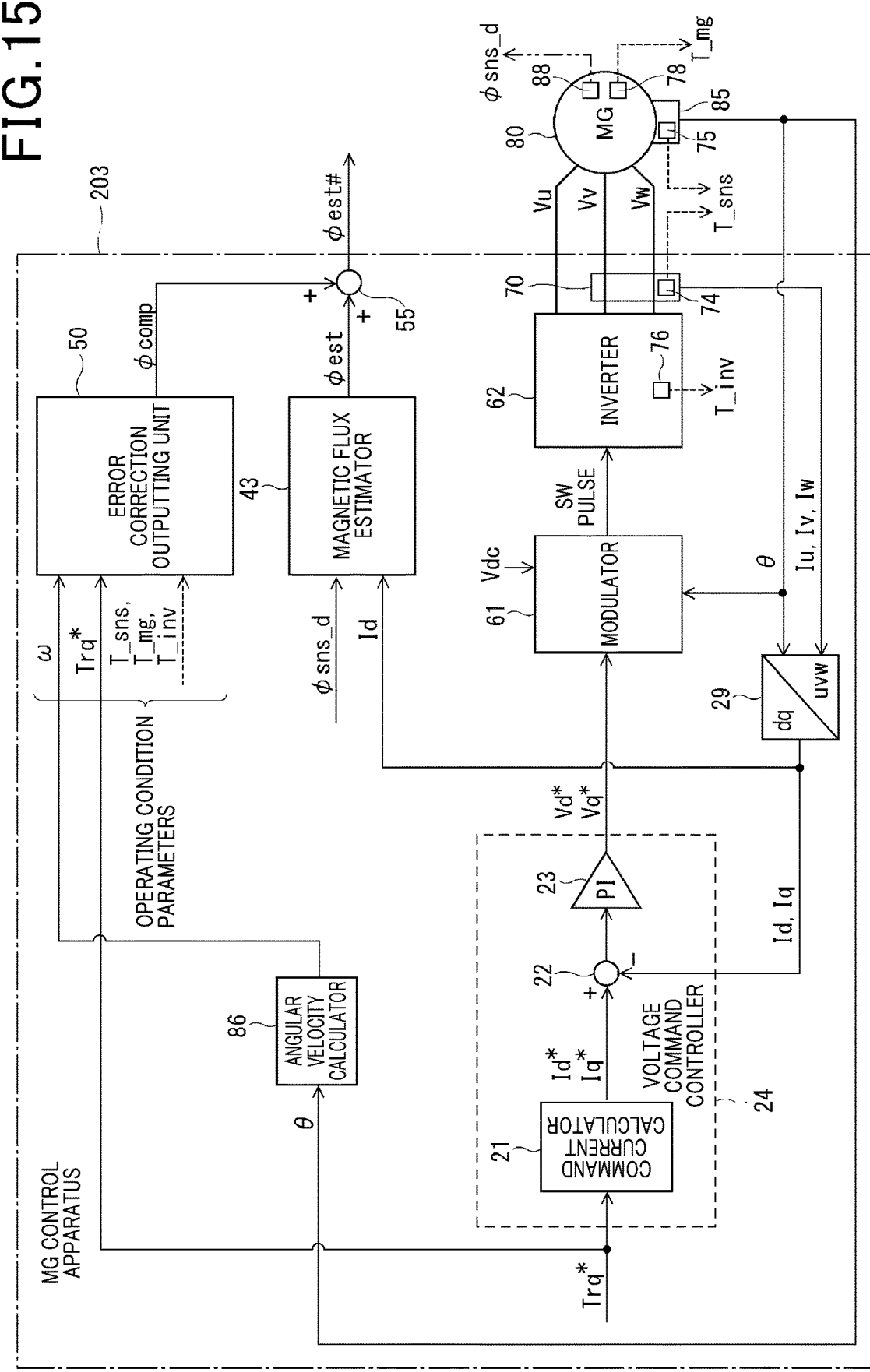
FIG. 15 is a block diagram schematically illustrating the structure of an MG control apparatus according to the third embodiment.

As illustrated in FIG. 15, the MG control apparatus 203 includes a magnetic sensor 88 provided in the MG 80 and configured to measure magnetic flux of the permanent magnet unit 80a2; the magnetic flux is comprised of a d-axis magnetic flux component $\phi_{sns\_d}$, because a q-axis magnetic flux component of the magnetic flux is zero.

The MG control apparatus 203 also includes a magnetic flux estimator 43 to which the d-axis magnetic flux component $\phi_{sns\_d}$ output from the magnetic sensor 88 and the d-axis current Id, i.e. the current measurement Id_sns, from the dq converter 29 are input.

The magnetic flux estimator 43 is configured to calculate the magnetic flux estimate $\phi_{est}$ of the magnetic flux of the permanent magnet unit 80a2 in accordance with the flux estimation parameters including the d-axis magnetic flux component and the d-axis current measurement Id_sns.

From the operating condition parameters input to the error correction outputting unit 50 according to the third embodiment, the DC voltage Vdc, i.e. the DC voltage parameter, is eliminated.

Figure 16:
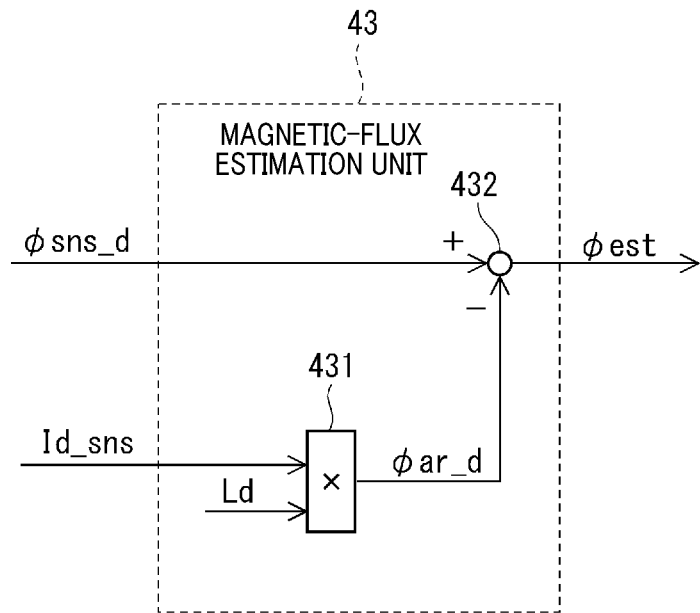
FIG. 16 is a block diagram schematically illustrating a magnetic flux estimator illustrated in FIG. 15.

FIG. 16 schematically illustrates an example of the structure of the magnetic flux estimator 43 according to the third embodiment. The magnetic flux estimator 43 includes a multiplier 431 and an adder 43. To the multiplier 431, the d-axis current measurement Id_sns is input. The multiplier 431 multiplies, by the d-axis inductance Ld, the d-axis current measurement Id_sns to thereby calculate a d-axis component $\phi_{ar\_d}$ of armature reaction magnetic flux in accordance with the following equation (6.1):

$$\phi_{ar\_d} = Ld \times Id\_sns \tag{6.1}$$

The adder 432 adds the d-axis component $\phi_{ar\_d}$ of the armature reaction magnetic flux to the d-axis magnetic flux component $\phi_{sns\_d}$ to thereby calculate the magnetic flux estimate $\phi_{est}$ in accordance with the following equation (6.2):

$$\phi_{est} = \phi_{sns\_d} + \phi_{ar\_d} \tag{6.2}$$

Note that the d-axis component $\phi_{ar\_d}$ of the armature reaction magnetic flux, which represents correction based on the armature reaction magnetic flux, can be included in the estimation error correction $\phi_{comp}$ output from the error correction outputting unit 50.

Figure 17:
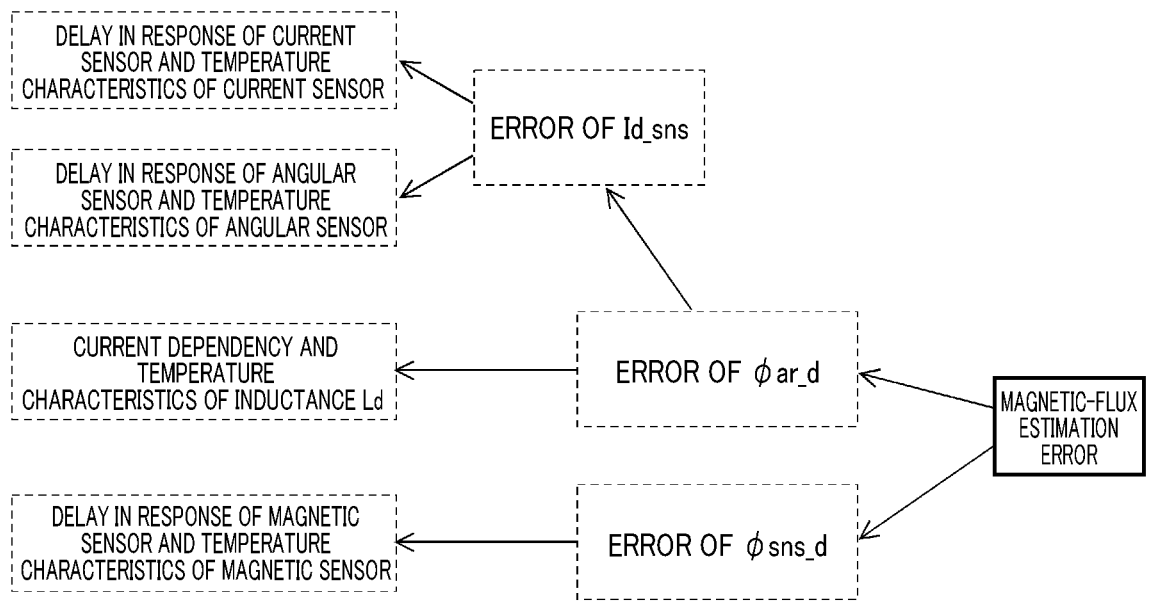
FIG. 17 is a factor analysis diagram of magnetic-flux estimation errors according to the third embodiment.

FIG. 17 schematically illustrates factors of the magnetic-flux estimation errors, and factors of variations of the flux estimation parameters.

An error of the armature reaction magnetic flux $\phi_{ar\_d}$ and an error of the magnetic flux measurement $\phi_{sns\_d}$ are extracted as the at least one factor of the magnetic flux estimation errors.

The factors of the error of the armature reaction magnetic flux $\phi_{ar\_d}$ include an error of the d-axis current measurement Id_sns and Iq_sns.

The factors of the error of the d-axis current measurement Id_sns include
(1) The temperature characteristics and the delay in response of the current sensor 70
(2) The temperature characteristics and the delay in response of the angle sensor 85

The factors of the error of the armature reaction magnetic flux $\phi_{ar\_d}$ include the temperature characteristics and the current dependency of the d-axis inductance Ld.

The factors of the error of the magnetic flux measurement $\phi_{sns\_d}$ include the temperature characteristics and the delay in response of the magnetic sensor 88.

FIG. 18 schematically illustrates the relationships between the factors of the magnetic-flux estimation errors, which are corrected by the error correction outputting unit 50, and the operating condition parameters according to the second embodiment. Because the magnetic flux estimator 43 is configured to calculate the magnetic flux estimate $\phi_{est}$ in accordance with the magnetic flux estimation equation based on the d-axis current Id and the magnetic flux measurement $\phi_{sns\_d}$ without using the command voltages Vd* and Vq*, the DC voltage parameter is not included in the operating condition parameters, and the magnetic-flux estimation errors due to the magnetic flux estimation equation depend on the current/torque parameter. This is because the command or actual d-axis current has one-to-one correspondence with the torque of the MG 80.

The factors of the magnetic-flux estimation errors include
(1) Current sensor variations
(2) Angular sensor variations
(3) Magnetic sensor variations
(4) Inductance variations The angular-velocity parameter addresses the delay in response of the current sensor 70 as the "current sensor variations", and the delay in response of the angle sensor 85 as the "angle sensor variations".

The current/torque parameter addresses the current dependency of the inductance Ld as the "inductance variations".

The MG-related temperature parameter addresses the temperature characteristics of each of the "current sensor variations", "angle sensor variations", "magnetic sensor variations", and "inductance variations".

The following describes the other embodiments or modifications of at least one of the first to third embodiments.

The magnetic flux estimator 41 is configured to calculate the magnetic flux estimate $\phi_{est}$ of the magnetic flux of the permanent magnet unit 80a2 using the q-axis voltage Vq*, but can be configured to calculate the magnetic flux estimate $\phi_{est}$ of the magnetic flux of the permanent magnet unit 80a2 using both the d-axis voltage Vd* and q-axis voltage Vq*.

This configuration results in little influence of variations of the sensor measurements and/or machine constant parameters on the magnetic flux estimate calculated by the magnetic flux estimator 41.

The following describes a modified calculation of the magnetic flux estimate by the magnetic flux estimator 41 with reference to FIG. 19.

The modified calculation of the magnetic flux estimate adds the magnetic-flux variation estimation $\Delta\phi_{est}$ to the standard magnetic flux $\phi_{std}$, thus calculating the magnetic flux estimate $\phi_{est}$ in the same approach as the equation (5.6). At that time, when the MG 80 is in the predetermined standard state, so that the magnetic flux of the permanent magnet unit 80a2 while the MG 80 is set to the standard magnetic flux, a voltage applied to the MG 80 is defined as a standard voltage, and the standard voltage has a d-axis component of Vd_std, which will be referred to as a d-axis standard voltage Vd_std, and a q-axis component of Vq_std, which will be referred to as a d-axis standard voltage Vq_std.

A q-axis voltage calculation method of calculating the magnetic flux estimate based on the q-axis command voltage Vq* without using the d-axis command voltage Vd* enables the magnetic-flux variation estimation $\Delta\phi_{est}$ to be expressed by the following equation (7):

$$\Delta\phi_{est} = \frac{Vq^* - Vq\_std}{\omega} = \frac{\Delta Vq1}{\omega} \tag{7}$$

That is, the numerator of the value $$\frac{Vq^* - Vq\_std}{\omega},$$

that is, the subtraction of the q-axis standard voltage Vq_std from the q-axis command voltage Vq*, will be referred to as a first q-axis voltage deviation $\Delta Vq1$.

In contrast, a dq-axis voltage calculation method of calculating the magnetic flux estimate based on the q-axis command voltage Vq* and the d-axis command voltage Vd* enables the magnetic-flux variation estimation $\Delta\phi_{est}$ to be expressed by the following equation (8):

$$\Delta\phi_{est} = \frac{\frac{Vq^*}{Vd^*} \times Vd\_std - Vq\_std}{\omega} = \frac{[Vq] - \Delta Vq\_std}{\omega} = \frac{\Delta Vq2}{\omega} \tag{8}$$

That is, the ratio of the q-axis command voltage Vq* to the d-axis command voltage Vd* is expressed by $$\frac{Vq^*}{Vd^*}.$$

The product of the ratio $$\frac{Vq^*}{Vd^*}$$

and the d-axis standard voltage Vd_std is defined as a q-axis actual voltage estimation [Vq]. Then, the subtraction of the q-axis standard voltage Vq_std from the q-axis actual voltage estimation [Vq] will be referred to as a second q-axis voltage deviation $\Delta Vq2$.

FIG. 19 illustrates the equation (8) in the d-q coordinate system. When a straight line connecting the origin of the d-q coordinate system and a coordinate point of the d- and q-axis command voltages (Vd*, Vq*) in the d-q coordinate system is defined as an actual voltage estimation line, the gradient of the actual voltage estimation line is expressed by the ratio $$\frac{Vq^*}{Vd^*}$$

of the q-axis command voltage Vq* to the d-axis command voltage Vd*. In other words, the ratio $$\frac{Vq^*}{Vd^*}$$

can be expressed by (1/tan θ) when the phase of the command voltage vector (Vd*, Vq*) is represented by Vθ. The q-axis actual voltage estimation [Vq] represents a value corresponding to the d-axis standard voltage Vd_std on the actual voltage estimation line.

FIG. 19 illustrates an example where the q-axis actual voltage estimation [Vq] is smaller than the q-axis standard voltage Vq_std, so that the second q-axis voltage variation ΔVq2 becomes a negative value, resulting in the magnetic-flux variation estimation Δϕ$_{est}$ becoming a negative value. This shows demagnetization of the permanent magnet unit 80a2 at its low temperature. In contrast, an increase of magnetization of the permanent magnet unit 80a2 at its low temperature results in the magnetic-flux variation estimation Δϕ$_{est}$ becoming a positive value.

The q-axis voltage calculation method calculates the magnetic-flux variation estimation Δϕ$_{est}$ based on the first q-axis voltage deviation ΔVq1 from the q-axis standard voltage Vq_std to the q-axis command voltage Vq*.

In contrast, the dq-axis voltage calculation method calculates the magnetic-flux variation estimation Δϕ$_{est}$ based on the second q-axis voltage deviation ΔVq2 from the q-axis standard voltage Vq_std to the q-axis actual voltage estimation [Vq]. That is, the dq-axis voltage calculation method enables an estimation error indicated by a block arrow to be reduced as compared with the q-axis voltage calculation method.

Each of the magnetic flux estimators 41 to 43 can be variably modified as long as the corresponding magnetic flux estimator is capable of calculating the magnetic flux estimate based on plural flux estimation parameters input thereto. The operating condition parameters input to the error correction outputting unit 50 are not limited to the parameters described in each of the first to third embodiments, and various operating condition parameters, which enable the error correction outputting unit 50 to output the estimation error correction ϕ$_{comp}$, can be used.

The control apparatuses according to the present disclosure are not limited to be applied to MGs for hybrid vehicles or electric vehicles, and can be applied to various permanent-magnet AC rotary electric machines in various fields. The control apparatuses according to the present disclosure can be applied to multiphase, such as two-phase or four or more phase, AC rotary electric machines.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control apparatus for an alternating-current rotary electric machine including a permanent magnet unit, the control apparatus comprising:
   a command voltage calculator configured to calculate a command voltage based on request torque for the rotary electric machine;
   a power converter configured to convert, based on the command voltage, input power input thereto into alternating-current power, thus supplying the alternating-current power to the rotary electric machine; and
   a magnetic flux estimator configured to calculate an estimate of magnetic flux of the permanent magnet unit in accordance with a plurality of flux estimation parameters;
   an error correction outputting unit configured to:
      store correction information indicative of a relationship between values of an estimation error correction and corresponding values of at least one parameter correlating with an operating condition of the rotary electric machine; and
      output, in response to an input of a value of the at least one parameter, a value of the estimation error correction from the correction information, the value of the estimation error correction corresponding to the input value of the at least one parameter; and
   a magnetic flux estimation corrector configured to correct, based on the value of the estimation error correction, the estimate of the magnetic flux calculated by the magnetic flux estimator to thereby output a corrected magnetic flux estimate.

2. The control apparatus according to claim 1, wherein:
   the at least one parameter comprises a plurality of operating condition parameters correlating with the operating condition of the rotary electric machine;
   the operating condition parameters include an angular velocity and torque of the rotary electric machine; and
   the error correction outputting unit is configured to:
      have the information indicative of the relationship between the values of the estimation error correction and corresponding values of each of the operating condition parameters including the angular velocity and torque of the rotary electric machine; and
      output, in response to the input of a value of each of the angular velocity and the torque of the rotary electric machine, a value of the estimation error correction from the correction information, the value of the estimation error correction corresponding to the input value of each of the angular velocity and the torque of the rotary electric machine.

3. The control apparatus according to claim 2, wherein:
   the magnetic flux estimator is configured to calculate the estimate of the magnetic flux of the permanent magnet unit in accordance with values of the respective flux estimation parameters;
   at least one of the values of the flux estimation parameters is measured by a sensor;
   the operating condition parameters include:
      a first temperature of the sensor;
      a second temperature of the rotary electric machine; and
      a third temperature of the power converter; and
   the error correction outputting unit is configured to:
      have the correction information indicative of the relationship between the values of the estimation error correction and corresponding values of each of the operating condition parameters including the first to third temperatures; and
      output, in response to the input of the value of each of the angular velocity and the torque of the rotary electric machine and a value of at least one of the first to third temperatures, a value of the estimation error correction from the correction information, the value of the estimation error correction corresponding to the input value of each of the angular velocity and the torque of the rotary electric machine, and the input value of the at least one of the first to third temperatures.

4. The control apparatus according to claim 2, wherein:
   the operating condition parameters include a direct-current voltage input to the power converter as the input power; and
   the error correction outputting unit is configured to:
      have the information indicative of the relationship between the values of the estimation error correction and corresponding values of each of the operating condition parameters including the direct-current voltage; and output, in response to the input of the value of each of the angular velocity and the torque of the rotary electric machine and a value of the direct-current voltage, a value of the estimation error correction from the correction information, the value of the estimation error correction corresponding to the input value of each of the angular velocity and the torque of the rotary electric machine, and the input value of the direct-current voltage.

5. A control apparatus for an alternating-current rotary electric machine including a permanent magnet unit, the control apparatus comprising:

a memory; and a processor communicable with the memory, the processor being configured to:

calculate a command voltage based on request torque for the rotary electric machine;

convert, based on the command voltage, input power input thereto into alternating-current power, thus supplying the alternating-current power to the rotary electric machine;

calculate an estimate of magnetic flux of the permanent magnet unit in accordance with a plurality of flux estimation parameters;

store correction information indicative of a relationship between values of an estimation error correction and corresponding values of at least one parameter correlating with an operating condition of the rotary electric machine;

output, in response to an input of a value of the at least one parameter, a value of the estimation error correction from the correction information, the value of the estimation error correction corresponding to the input value of the at least one parameter; and correct, based on the value of the estimation error correction, the estimate of the magnetic flux calculated by the magnetic flux estimator to thereby output a corrected magnetic flux estimate.

* * * * *